Aug. 7, 1956
S. E. WINDER
2,757,484
BOTTLE FORMING MACHINE
Original Filed Aug. 5, 1946
12 Sheets-Sheet 1
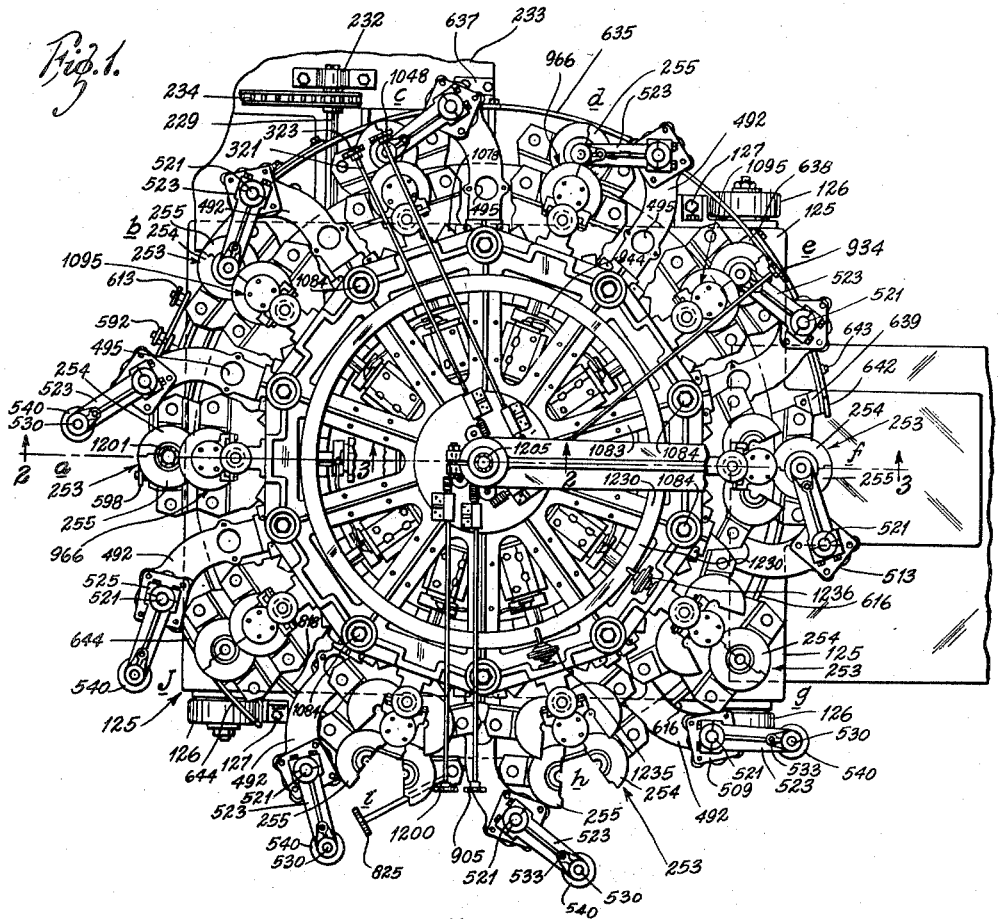
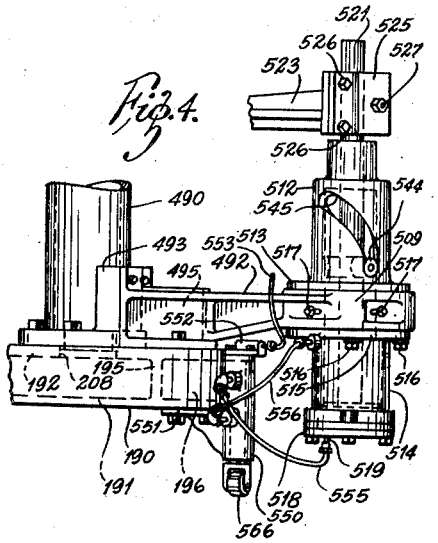
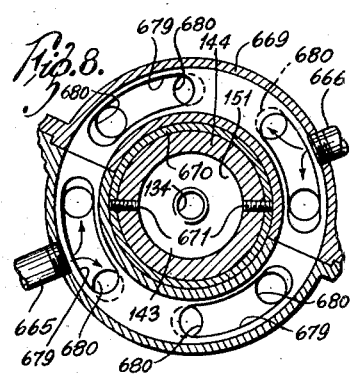
INVENTOR:
SAMUEL E. WINDER,
By Kingsland, Rogers & Ezell
ATTORNEYS

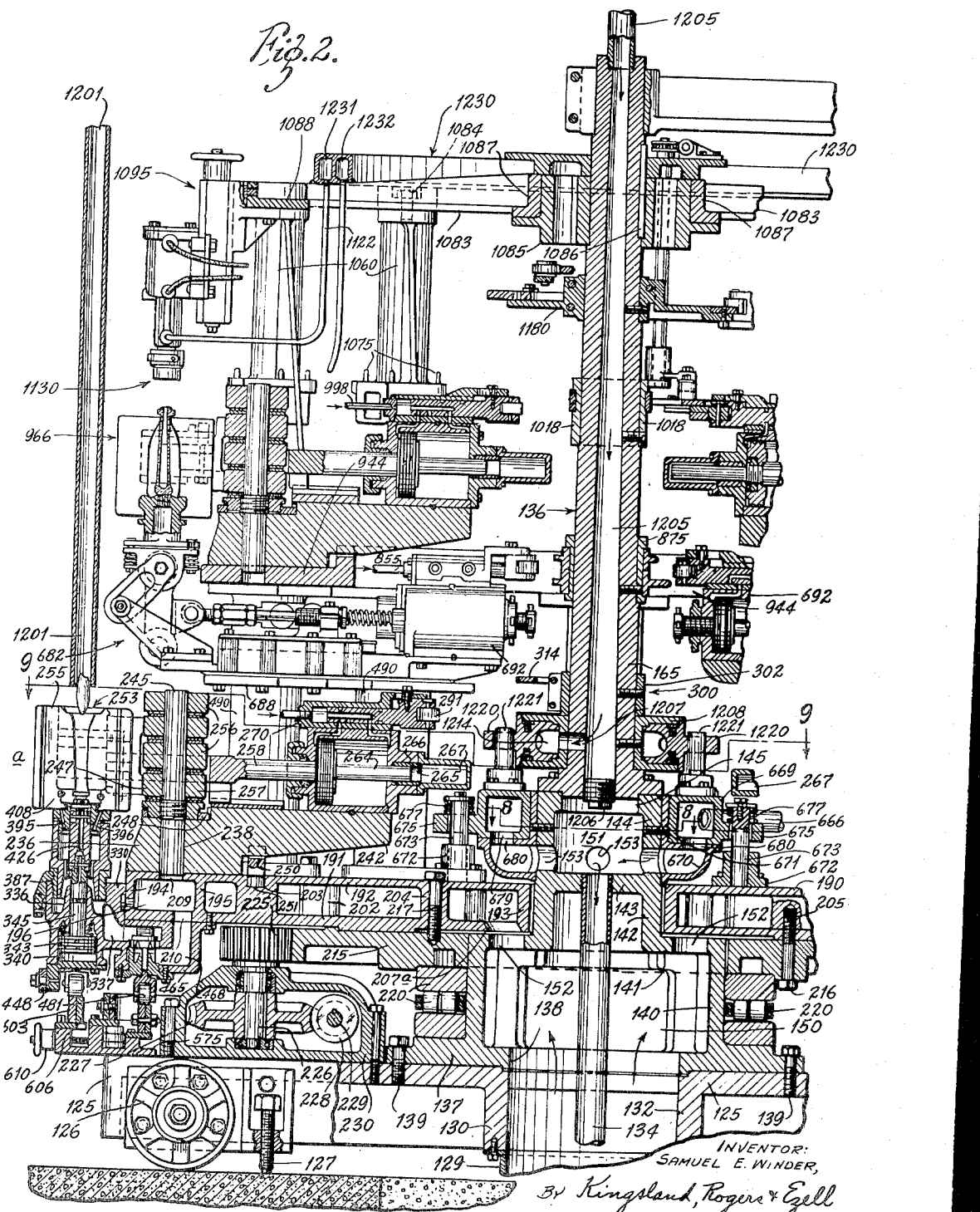

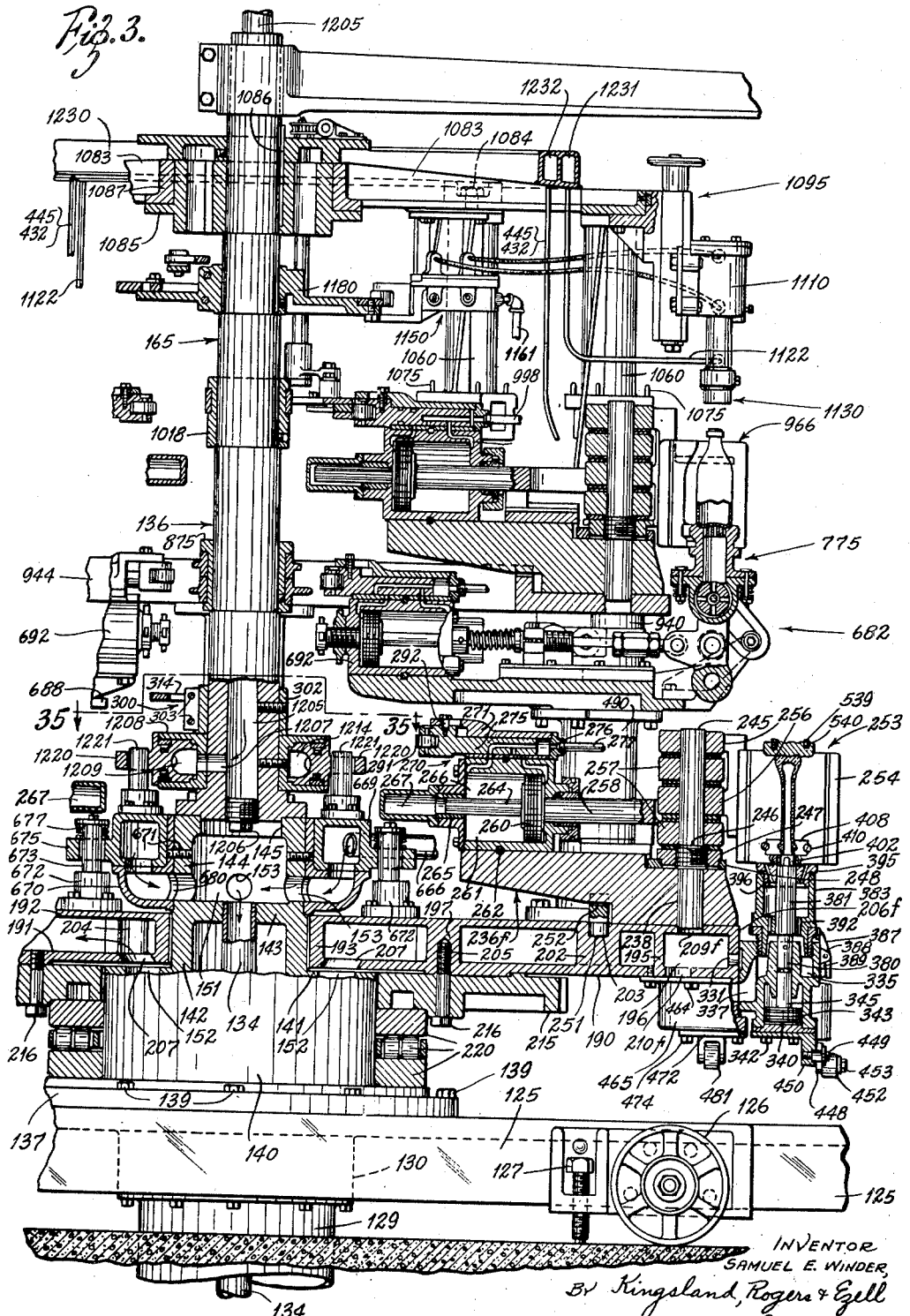

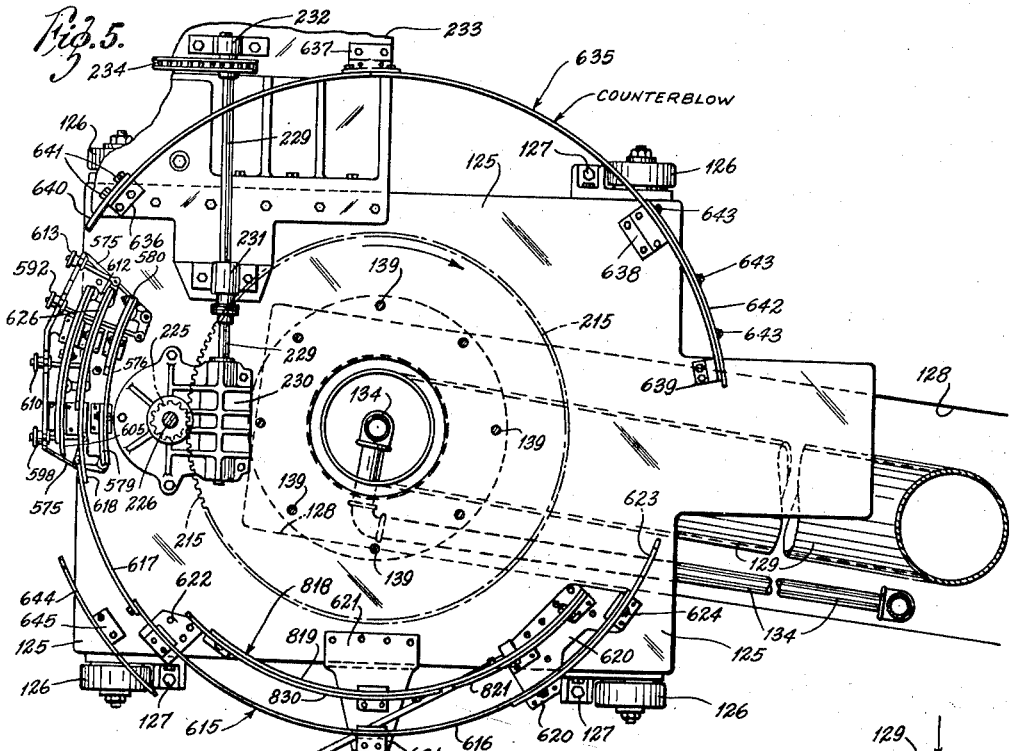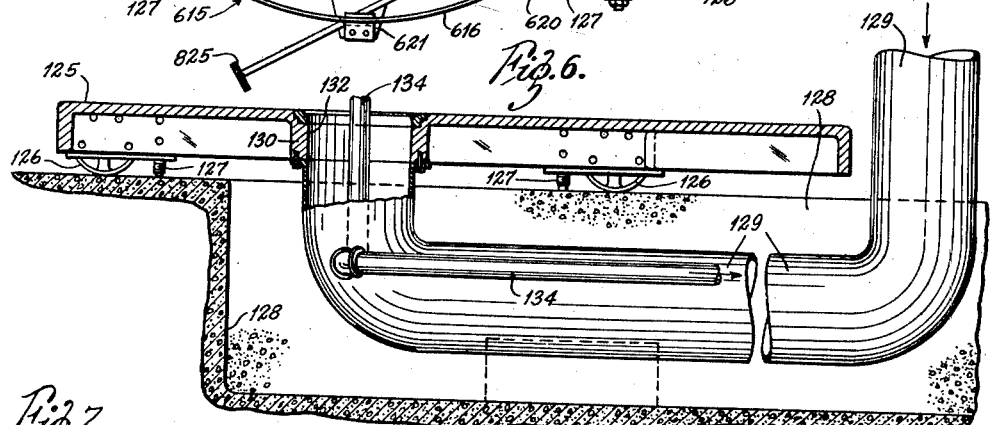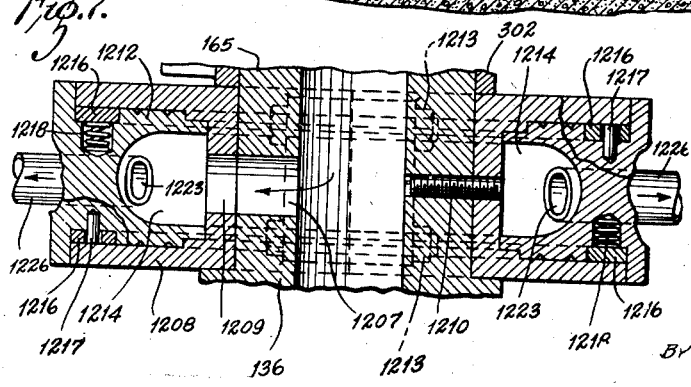

Aug. 7, 1956 S. E. WINDER 2,757,484
BOTTLE FORMING MACHINE
Original Filed Aug. 5, 1946 12 Sheets-Sheet 5
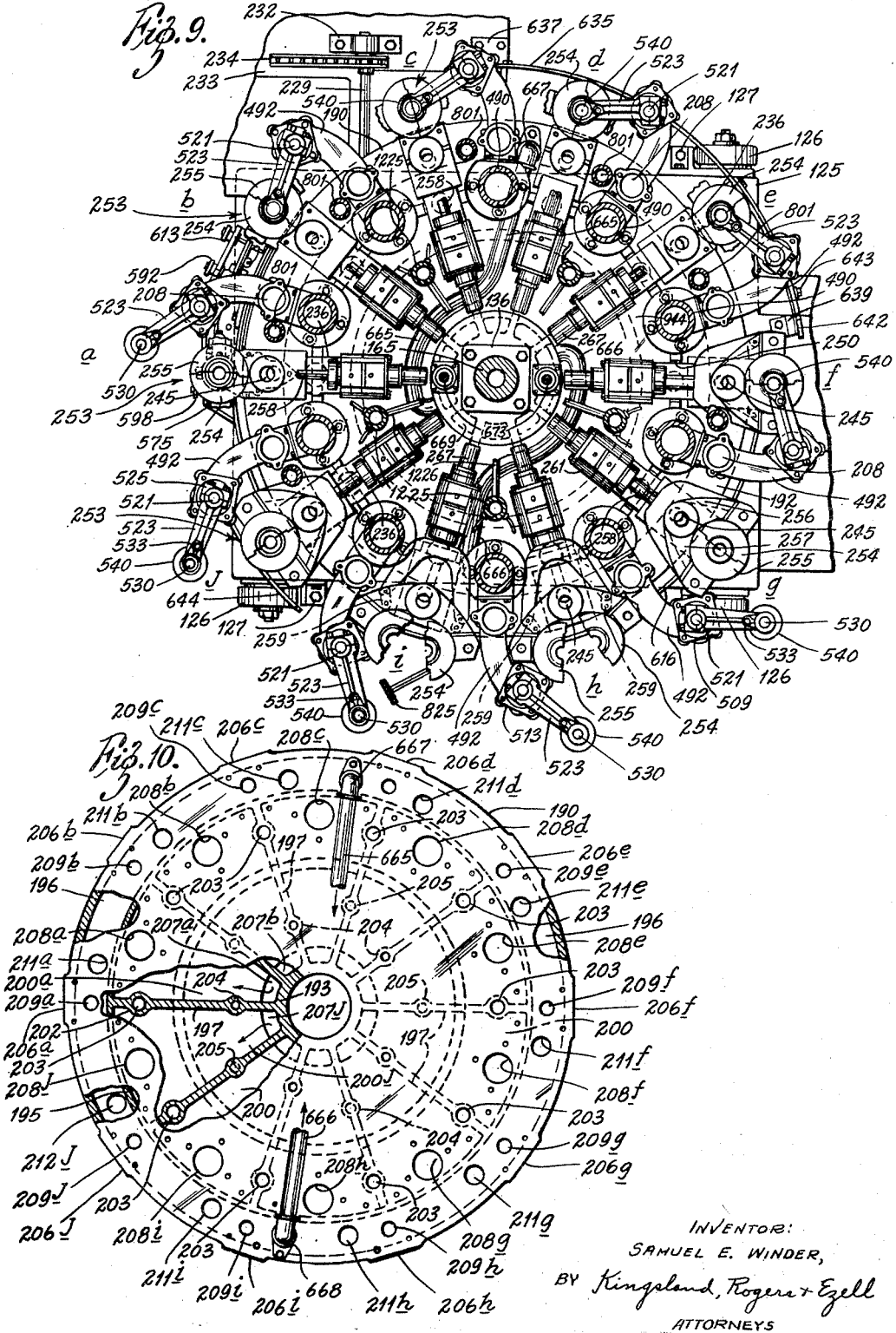
INVENTOR:
SAMUEL E. WINDER,
BY Kingsland, Rogers & Ezell
ATTORNEYS

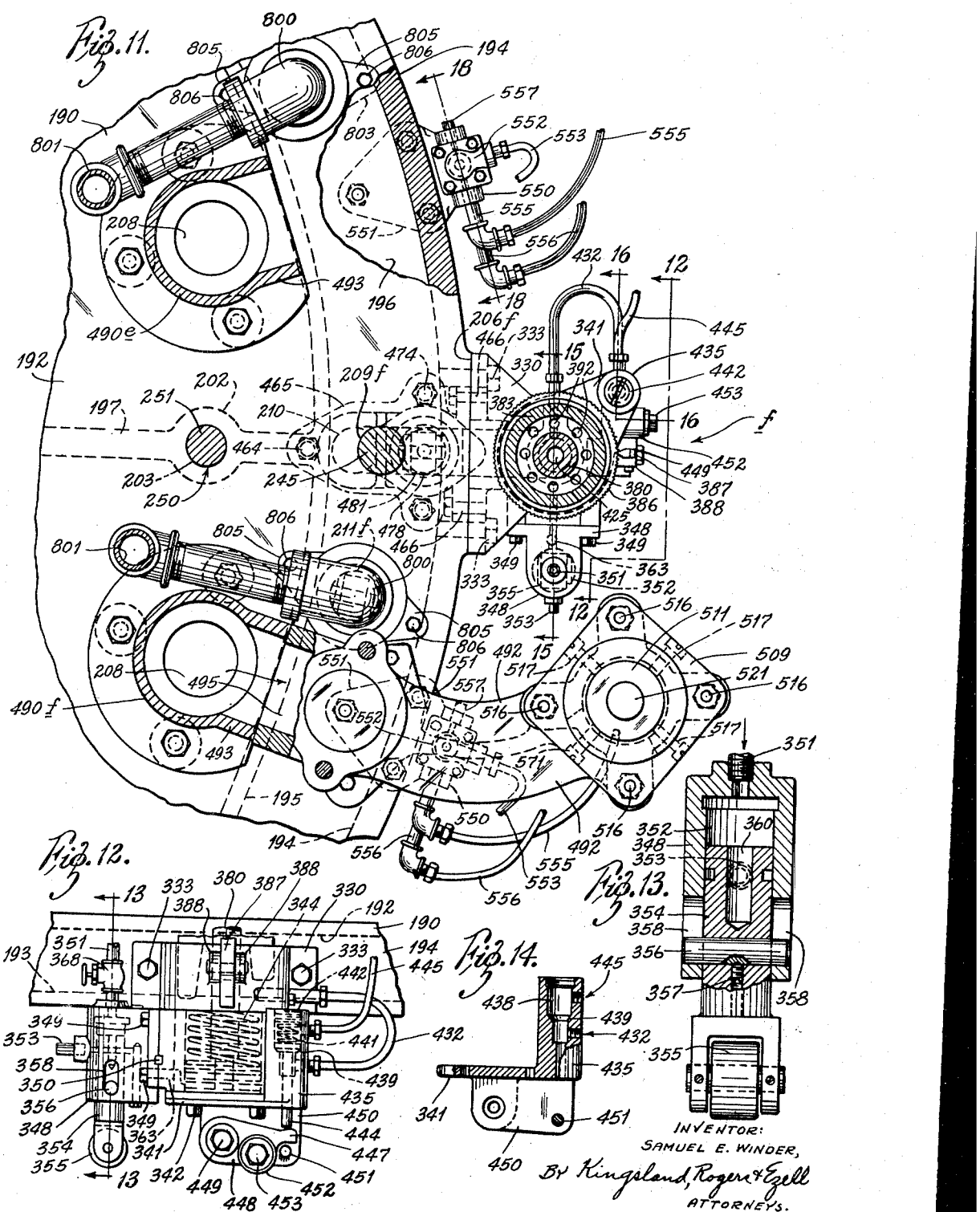

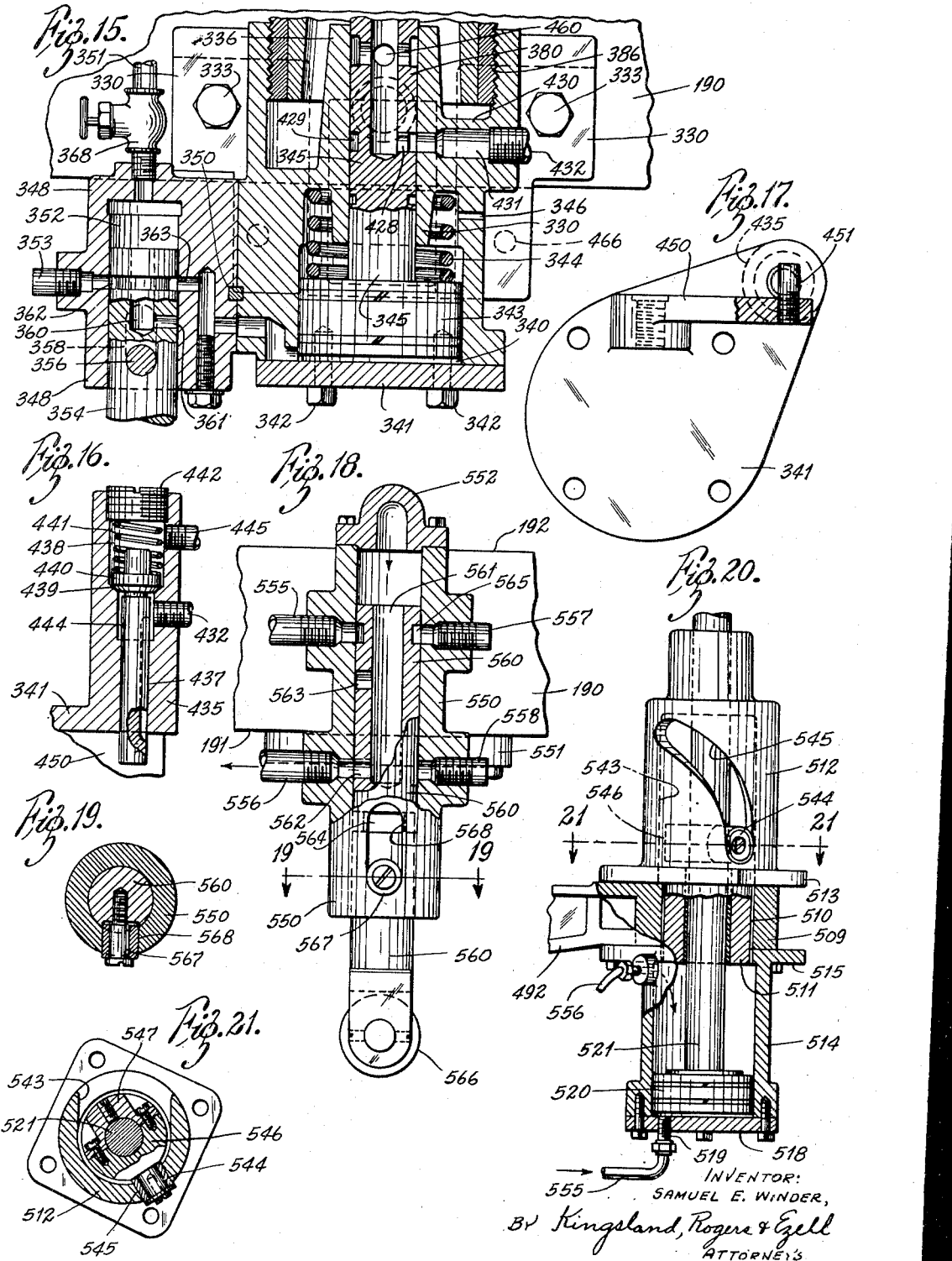

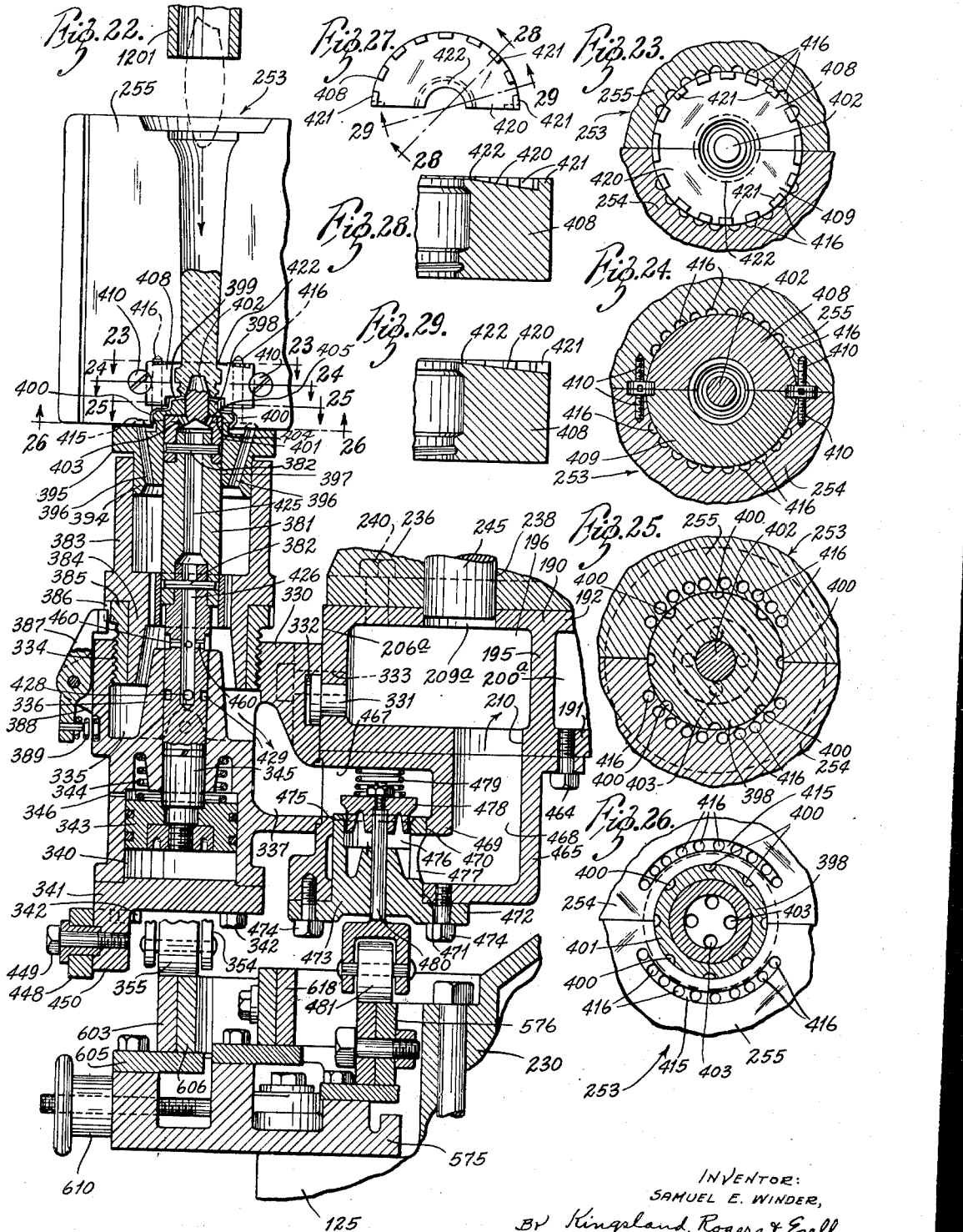

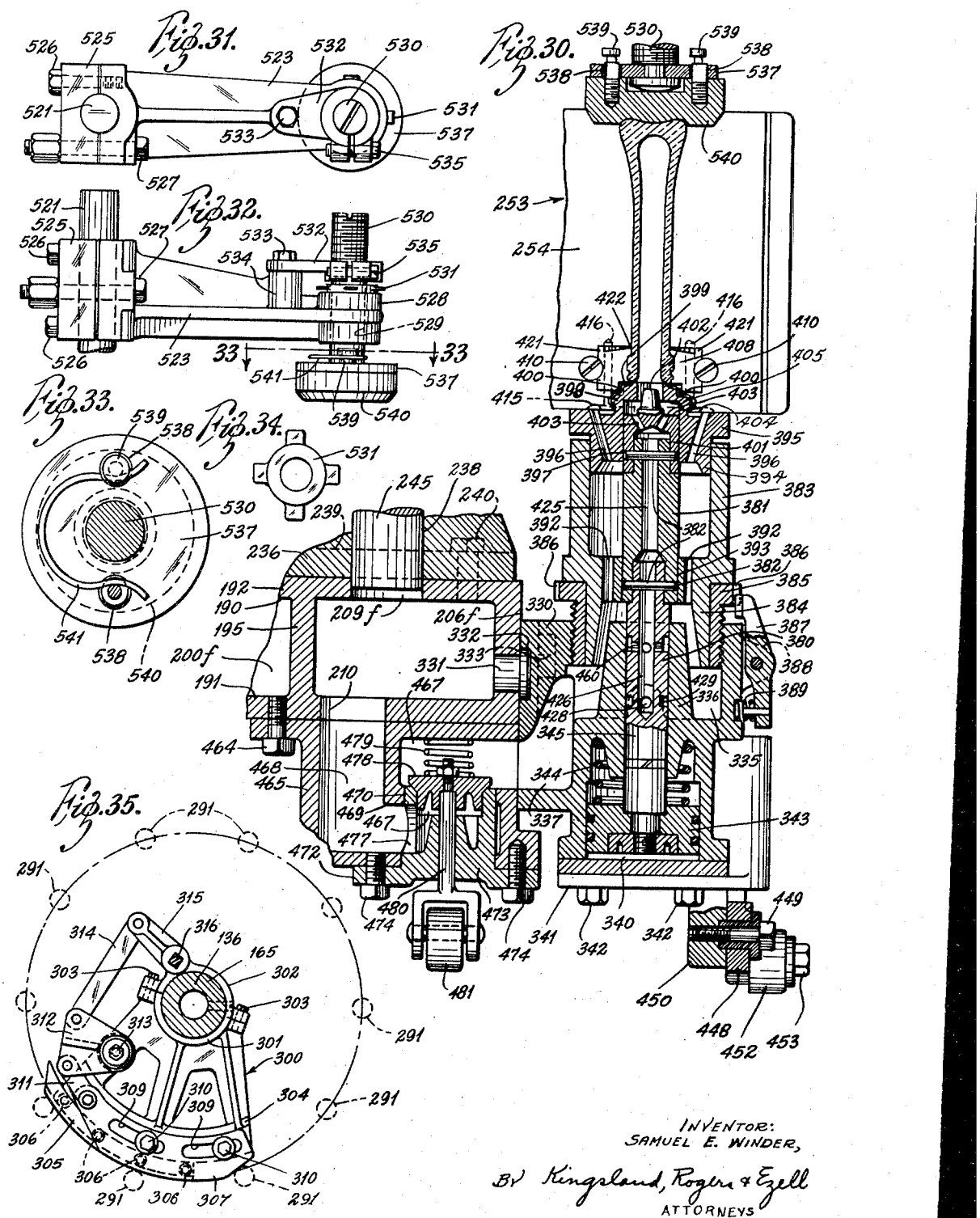

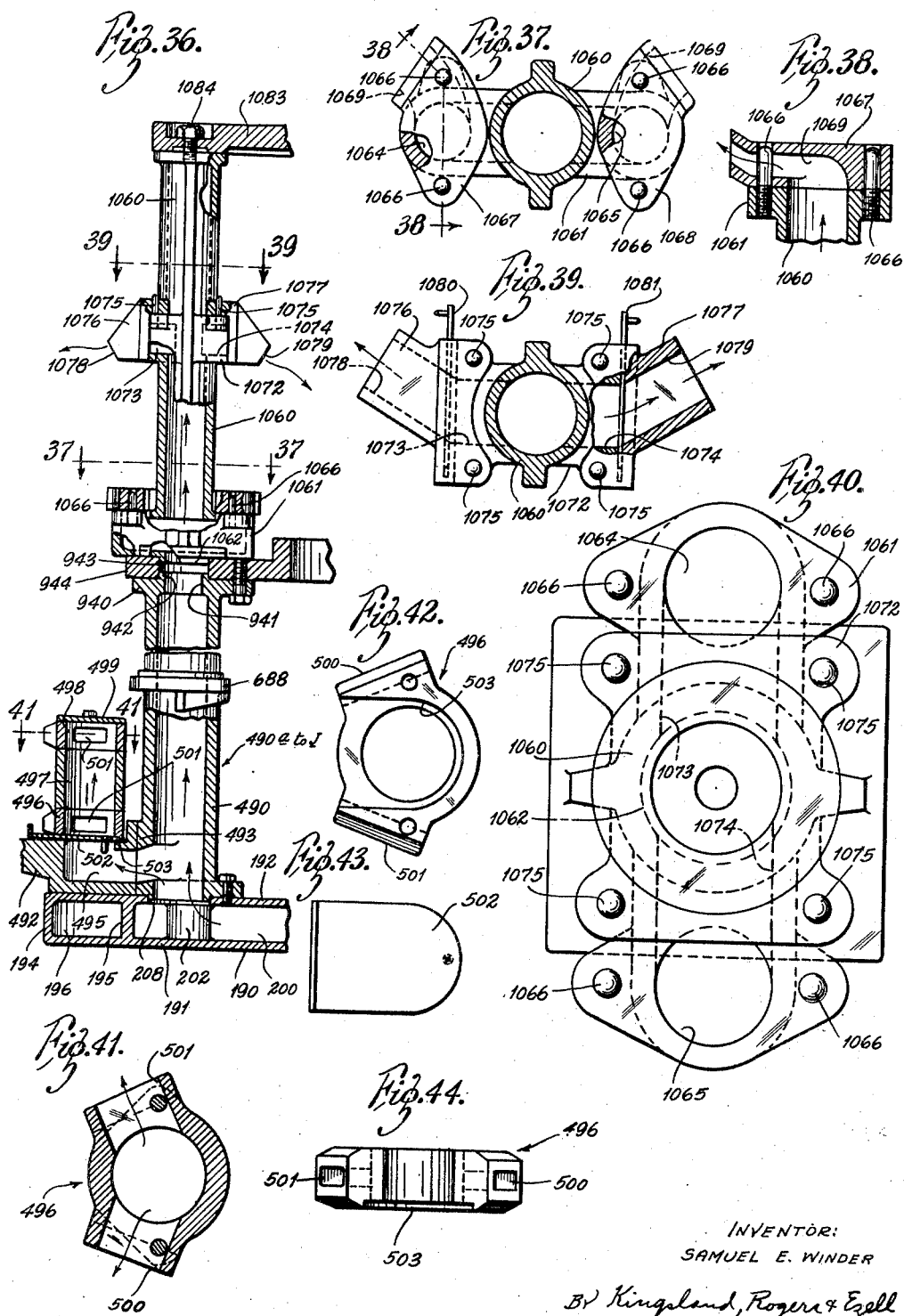

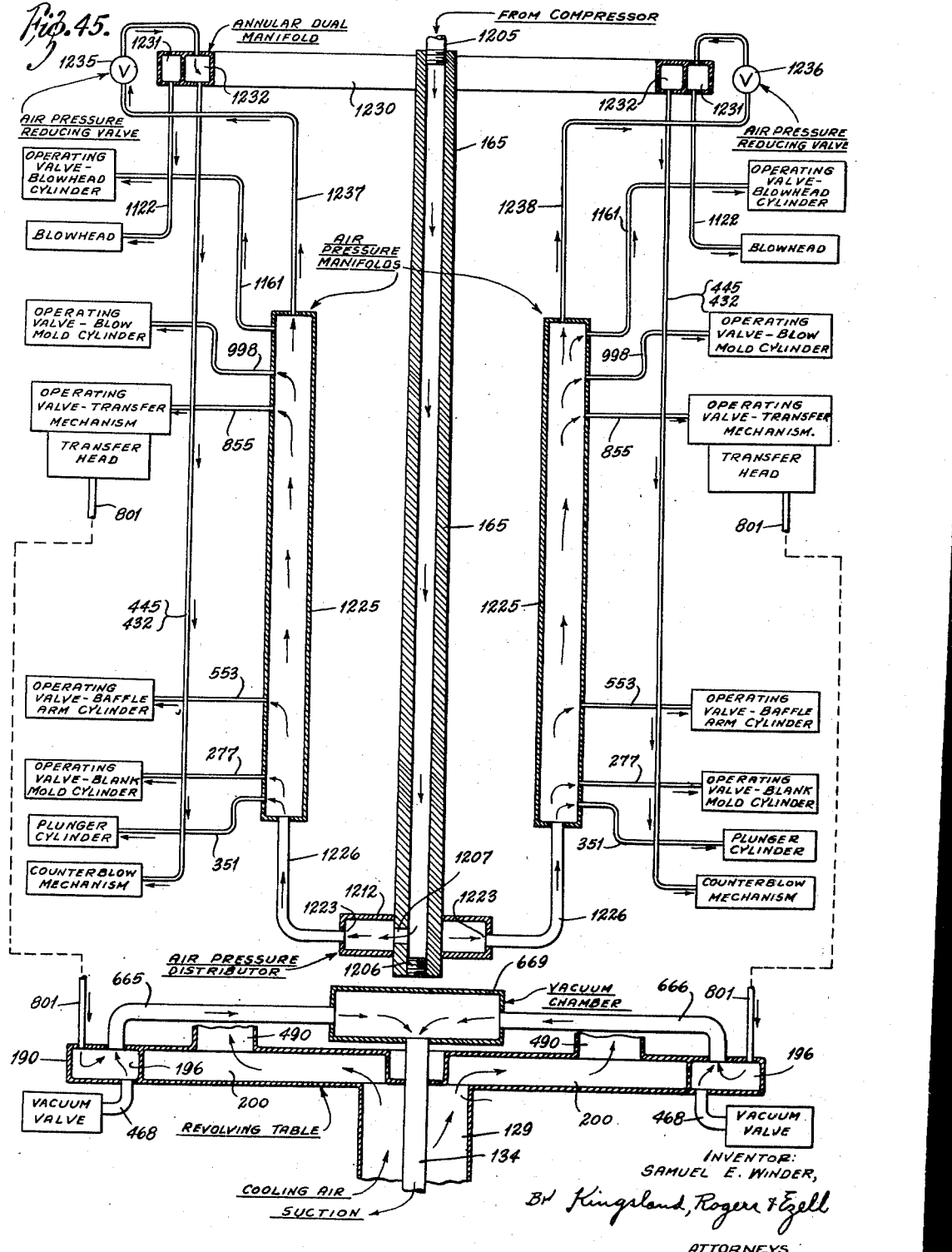

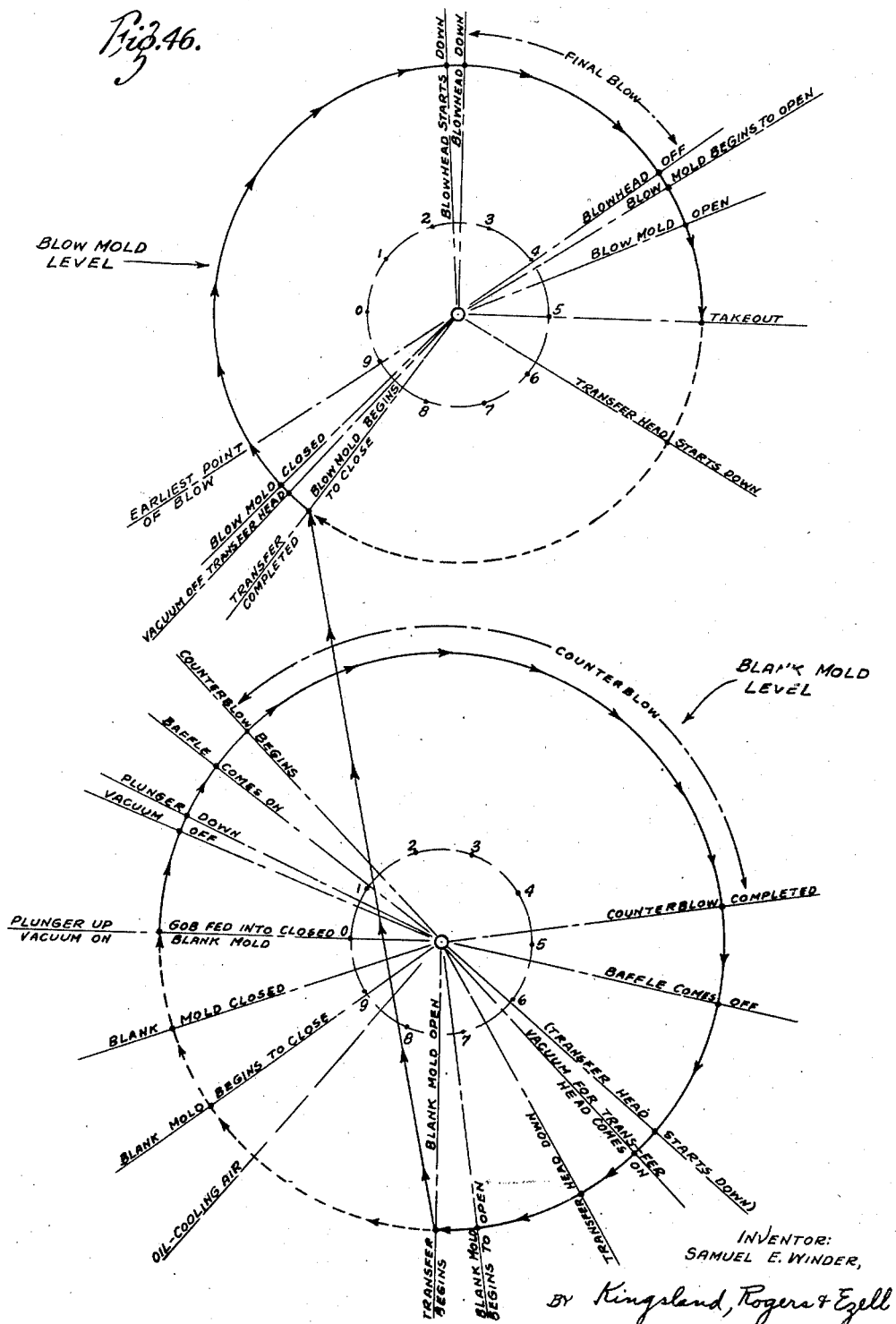

United States Patent Office 2,757,484
Patented Aug. 7, 1956

2,757,484

BOTTLE FORMING MACHINE

Samuel E. Winder, West Medway, Mass., assignor of one-half to Henry C. Daubenspeck, Massillon, Ohio Original application August 5, 1946, Serial No. 688,470. Divided and this application November 19, 1951, Serial No. 257,021

25 Claims. (Cl. 49—9)

The present invention relates to a bottle forming machine. In this connection, the manufacture of bottles is the primary concern of the invention. However, it will be readily understood that many of its features may be applied to the production of other glass products, particularly container ware.

The subject matter of the present invention was originally disclosed in applicant's copending patent application Serial No. 688,470, filed August 5, 1946, from which the present application has been divided.

It is the prime object of this invention to provide a machine by which glass products as mentioned above may be made more rapidly. It is a further prime object of the invention to provide a machine by which better quality glass products may be made with fewer rejects.

It is a further object of the invention to provide a machine of this kind which will rapidly produce the glass products in a continuous operation from a glass charging point to a ware removing point.

It is a further object to provide a machine that makes more glass products per unit of time, but which may be operated with a minimum number of men. Particularly, it is an object to provide such a machine having all of the operations that require attention available from one position, and having these operations sufficiently free of complications to be cared for by one man. To this end, it is an object to eliminate, to the maximum extent, interoperations of parts that require precise synchronization to obtain proper operation and satisfactory production of glassware. In particular, it is an object to eliminate the split-second synchronization of neck ring and mold opening and mold closing operations.

It is a further object to provide a machine that increases the output of ware per unit of time without great change in the mold rate, or time required for formation of an individual product from an initial charge of glass.

It is a further object to provide a machine having a cycle that may be speeded up or slowed down to change the production rate, particularly for adaptation to different sizes of ware.

Another object is to provide a machine in which the amount of heat dissipation in the blank molds is a substantially larger proportion of the total heat dissipation for the entire cycle. Specifically, it is an object to provide a system wherein the transfer from blank to blow mold occurs after greater heat dissipation in the blank mold than has heretofore been accomplished with the present type of operation. A particular object is to reduce the ratio of time for making the finish on the ware to total time of the making of the parison in the blank mold.

A further object is to provide a machine making better bottles, with even walls and well finished bottoms. Specifically, it is an object to provide a system wherein temperature irregularities in a charge of glass are overcome to a greater degree, where neck ring checks are eliminated, and settle waves are minimized.

A further object of the invention is to provide a machine for making glass objects in two separate stages of formation of a parison and subsequent formation of the object from the parison, wherein a relatively stiff parison is formed and transferred from the parison mold to the finish mold. A further object is to provide a machine of this kind by which such relatively stiff parison is formed. A further object is to form a relatively stiff parison that is not as subject to deformation in a transferring operation as is a conventional parison.

A further object of the invention is to provide a machine wherein a parison is formed so as to be completed at the bottom in an area that will be a completed bottom part of the final glassware. A further object is to provide a parison that has substantially the length of the completed ware, and which has a supporting surface at its bottom, whereby it may be introduced into a finish mold and be supported at its bottom therein. Stated generally, on this aspect, it is an object of the invention to provide a machine which eliminates the run or stretch-down of the parison in a finish mold. It is a further object of the invention to provide a machine wherein a relatively stiff parison is formed so as to be supportable at its top and at its bottom in a finish mold.

A further object of the invention is to provide a machine of the foregoing type wherein a charge of glass is introduced into a blank mold and is very rapidly forced to the bottom of the blank mold so as to complete the finish of the ultimate ware onto the parison, and is promptly forced back into the blank mold to complete the parison with a minimum of dwell of the charge of glass in its forced down condition. A specific object is to cause the forcing back operation aforesaid to complete a section of the opposite end of the parison for the previously mentioned reasons.

A further object of the invention is to provide, particularly in a blow and blow type of machine, a relatively long counterblow operation for the parison, including sufficient time of dwell of the parison in the blank mold, so that it becomes relatively stiff, whereby it may be transferred with minimum damage, and whereby a better product may be produced.

A further object of the invention is to provide a single continuously operating machine for performing each and all of the foregoing objects. More particularly, it is an object of the invention to provide a continuous machine to produce the cycle of said operations as aforesaid.

Another object is to provide a machine that secures tight fit of a vacuum head with the blank mold, and insures smooth opening of the blank mold. More particularly, it is an object to provide an arrangement of an airflow head and a mold that secures a tight fit between them, prevents crashing of the parts, and insures proper alignment of the mold sections.

A further object of the invention is to provide a machine of this kind wherein there is a base with an upstanding central column thereon, and a framework rotatably mounted upon the base and having stabilized bearing on an upper part of the central column, which framework constitutes the support for the blank molds and the associated parts thereof.

A further object of the invention is to provide a machine of this kind having a minimum of separately designed parts and a maximum of interchangeable parts. A particular object is to have mold units that are readily removable as units, and that are interchangeable. Specifically, in this connection, it is an object of the invention to provide blank molds with interchangeable mounting parts, interchangeable power operating parts, and interchangeable valve controlling parts. A further object of the invention is to provide quickly operating aligning means for insuring the proper relative disposition of the several parts, together with securing means by which the parts may be attached together.

A further object of the invention is to provide a machine of this kind wherein alterations and changes necessary to the production of different sizes and shapes of ware may quickly and easily be made.

A further object of the invention is to provide for the ready adjustment of the coordination and timing of the several operations, and particularly to provide convenient means for adjusting the timing operations while the machine is in operation.

A further object of the invention is to provide a desirable air distribution means. A particular object of the invention is to provide an air distribution means wherein air may be received in the central column and distributed therefrom without leakage. A further object of the invention is to provide such an air distribution system involving a plurality of air manifolds that may conveniently be connected to the several operating devices of the machine.

A further object of the invention is to provide a convenient vacuum means for the operations involved, which vacuum means includes a rotating vacuum chamber from which connections may be made to the parts requiring vacuum.

A further object of the invention is to interrelate the vacuum and air operating parts with maximum compactness and yet maximum accessibility for repairs and the like.

A further object of the invention is to provide a convenient system of distributing the cooling air to certain parts of the machine that require cooling.

A general object of the invention is to provide all of the foregoing features in a single composite machine requiring a minimum of floor area. A further object of the invention is to provide such a compact machine, in which parts requiring lubrication are accessible at any time.

In the drawings:

Fig. 1 is a top plan view of a bottle forming machine embodying the present invention, some of the flexible tubing for the various valves being omitted in the interest of clarity;

Figs. 2 and 3 are vertical radial sectional views taken approximately on the lines 2—2 and 3—3, respectively, in Fig. 1, the two sections in the aggregate comprising a substantially diametrical vertical sectional view through the entire machine, certain portions of mechanism in the background being omitted, also in the interest of clarity;

Fig. 4 is a side elevational view of one of a series of baffle arm operating cylinders and its associated roller operated valve;

Fig. 5 is a top plan view of the base portion of the machine only, having mounted thereon the driving mechanism, and a series of adjustable roller tracks for operating the plunger cylinders and vacuum valves;

Fig. 6 is a vertical cross-sectional view through the base and pit therebeneath only, particularly illustrating the means whereby cooling air and suction are supplied to the machine.

Fig. 7 is a fragmentary enlarged view of a portion of Fig. 2 just above the section 9—9 at the center column, particularly illustrating the construction of the compressed air distributor of the machine;

Fig. 8 is a horizontal sectional view on the line 8—8 in Fig. 2;

Fig. 9 is a horizontal section illustrating the blank mold mechanism, the plane of the section being approximately indicated by the line 9—9 in Fig. 2;

Fig. 10 is a plan view of the revolving table of the machine with portions of the top wall thereof broken away;

Fig. 11 is a fragmentary horizontal sectional view comprising approximately the right hand portion of Fig. 9, on an enlarged scale, certain parts of Fig. 9 being sectioned differently;

Fig. 12 is a side elevation of one of the plunger cylinder valve and counterblow valve assemblies, the view being taken on the line 12—12 at the right center of Fig. 11;

Fig. 13 is a vertical sectional view through the plunger cylinder valve taken on the line 13—13 at the right center of Fig. 12;

Fig. 14 is a detail view, partly in section, of a valve body included in the assembly of Fig. 12;

Fig. 15 is a vertical sectional view taken approximately on the line 15—15 at the right center of Fig. 11;

Fig. 16 is a vertical sectional view taken approximately on the line 16—16 at the right center of Fig. 11;

Fig. 17 is a bottom plan view, partly in section, of the valve body shown in Fig. 14;

Fig. 18 is a vertical section on the line 18—18 at the upper center of Fig. 11, illustrating in particular one of the baffle cylinder valves;

Fig. 19 is a horizontal sectional view on the line 19—19 in Fig. 18;

Fig. 20 is a detail view, partly in section, of one of the baffle cylinder constructions;

Fig. 21 is a horizontal sectional view on the line 21—21 of Fig. 20;

Fig. 22 is a reproduction of the lower left hand portion of Fig. 2 on an enlarged scale, showing parison or blank forming mechanism;

Figs. 23, 24, 25, and 26 are horizontal sectional views taken on the lines 23—23, 24—24, 25—25 and 26—26 of Fig. 22;

Fig. 27 is a top plan view of a finish or neck ring segment;

Figs. 28 and 29 are vertical radial sectional views of the finish ring taken on the lines 28—28 and 29—29 in Fig. 27;

Fig. 30 is a reproduction on an enlarged scale of the lower right hand corner of Fig. 3, showing parison forming mechanism in an operating stage different from that of Fig. 22;

Fig. 31 is a top plan view of a baffle arm for the parison mold, that is adjustably mounted on the upper end of a baffle cylinder shaft;

Fig. 32 is a side elevational view thereof;

Fig. 33 is a horizontal sectional view on the line 33—33 in Fig. 32;

Fig. 34 is a detail view of an adjustment lock nut for the baffle head;

Fig. 35 is a horizontal sectional plan view on the line 35—35 about half way up the column in Fig. 3, illustrating an adjustable cam assembly for operating the valves controlling the opening and closing of the blank molds;

Fig. 36 is a vertical sectional view, partly in elevation, of one of the blow mold hanger base ring supporting columns in position on the revolving table, in aligned relation with one of the extension columns for the blow molds, the upper half portion of the view being turned 90° from the lower half portion to clarify the mounting arrangement for the blow mold nozzles;

Fig. 37 is a horizontal sectional view on the line 37—37 in Fig. 36;

Fig. 38 is a vertical sectional view on the line 38—38 of Fig. 37;

Fig. 39 is a horizontal sectional view on the line 39—39 in Fig. 36;

Fig. 40 is a detail top plan view, on an enlarged scale, of the extension column for the blow molds;

Fig. 41 is a horizontal sectional view on the line 41—41 in Fig. 36;

Fig. 42 is a detail bottom view of one of the wind nozzles for the blank molds;

Fig. 43 is a detail top plan view of an air regulating damper associated with the nozzle of Fig. 42;

Fig. 44 is a left end elevational view of the nozzle shown in Fig. 42;

Fig. 45 is a schematic layout illustrating the flow of compressed air, vacuum, and cooling air for the machine; and Fig. 46 is a diagrammatic layout illustrating the cycle of operation.

Description of the machine base

This machine is adapted to be mounted upon a movable base 125. This base is generally rectangular in horizontal shape, as appears in Fig. 6 as well as in Fig. 1, and it comprises an upper table-like surface and side flanges. Suitable wheels 126 are located at the corners, being mounted on brackets attached to the base 125. The machine may be rolled on these wheels. The brackets also support jack screws 127 that may be turned down when the base is properly located, so as to keep it from moving.

The base is adapted to be rolled over a pit, preferably one with solid walls. Such a pit is shown at 128 in Fig. 7. This pit may form a conduit for the reception of a cooling air duct 129 that extends upwardly so as to be united with a downwardly extending circular flange 130 on the center of the base 125. This flange 130 provides a central opening 132 leading upwardly through the table and around the upper edge. The opening 132 also receives a vacuum pipe connection 134. This line may extend down through the duct 129 and then outwardly through the wall thereof, as shown in Fig. 7. It ultimately is connected to a vacuum source.

The base 125 supports a composite central column, generally designated 126, about which operating parts revolve. This column includes a round bottom part 137, having a center opening 138 with a ridge around it to interfit with the groove at the top of the opening 132 in the base 125. This arrangement locates the upper parts relative to the base, and provides for air flow from the base into the bottom of the column. The lower column part 137 has a flange around its lower periphery, through which screws 139 pass to secure the column to the base 125. The lower column part 137 has a lower cylindrical vertical wall portion 140 extending upwardly from its bottom and joined by a horizontal section 141 to a smaller, intermediate, cylindrical vertical wall section 142. The intermediate wall 142 is capped by a partition 143. Above the partition 143, there is an upper cylindrical wall 144, slightly smaller than the intermediate wall, to provide a shoulder between them. This upper wall is flanged inwardly at the top and has a top opening 145.

It will be seen that the upper end of the vacuum pipe 134 is secured in the partition 143. It divides the cooling air manifold from the vacuum outlet manifold, both of which are partly formed in the bottom column member 137. The cooling air manifold chamber is indicated at 150, being below the partition 143; and the vacuum exhaust manifold above the partition 143 is designated 151. The ledge 141 provides a plurality of openings 152 that comprise outlets from the cooling air manifold 150. The upper extension 144 has a plurality of ports 153 that provide inlet ports to the vacuum exhaust manifold 151. The ports 153 are four in number around the axis of the columns.

From the top of the extension wall 144, there extends the upper column part 165. This column is flanged at its bottom and is provided with a circular projection that fits into the opening 145 at the top of the wall 144 and insures location of these parts. It is held onto the wall 144 by screws, as shown in the drawings.

Revolving table

At the bottom of the machine, there is a revolving table 190, shown in plan view in Fig. 10. This revolving table has a bottom wall 191 and a top wall 192. The top and bottom walls are joined by a circular hub wall 193 that is adapted to fit around the intermediate upstanding circular wall 142 of the lower column member 137. The rotating table also has an outer circular wall 194, and, spaced inwardly from the wall 194, another circular wall 195. The two outer walls 194 and 195, together with the top and bottom walls, provide an outer, annular vacuum chamber 196.

Extending between the inner wall 193 and the intermediate wall 195 are a plurality of radial reenforcing webs 197 that divide the space between the walls 193 and 195 into a plurality of sectorial chambers 200, designated as 200a to 200j, inclusive. (As there are ten mold sets on this machine, all identical, the reference numbers will be applicable to the corresponding parts of any one set. At times, the several sets and their component parts will be distinguished by the suffix characters a through j, the a set being at the nine-o'clock or charging position in the drawings.)

Each of the webs 197 has a boss 202 that has a hole 203 drilled down into it from the upper surface of the table. These holes 203 are accurately disposed around the table, for a purpose to appear. Alternate webs have bosses 204 toward the hub wall 193, and bosses 205 somewhat further out than the bosses 204. The inwardly spaced bosses 204 have holes drilled all the way through them, whereas the outwardly spaced ones 205 are drilled and tapped upwardly from the bottom.

The outer surface of the wall 194 of the table is provided with a plurality of flat portions 206a to 206j, inclusive, for the reception of mold head parts, as will appear.

The bottom wall 191 of the rotating table is provided with a plurality of air inlet openings 207a through 207j, there being one such opening for each of the sectorial chambers 200a through j, respectively. These inlet ports 207 are adapted to register at all times with the ports 152 leading from the shelf 141 on the lower column member 137. Each of the sectorial chambers of the table is also provided with an outlet in the form of an opening 208, there being ten such openings 208a through 208j. These openings 208 are accurately sized and spaced around the table.

The top wall 192 of the rotating table is also provided with a series of openings 209 leading into the annular chamber 196 opposite the end of each of the radial webs 197. They are accurately sized and spaced around the table, and constitute means used in aligning molds on the table 190. On an approximate radial line with the openings 209, the bottom wall 191 of the table is provided with a plurality of openings 210, one for each of the webs, as shown at 210a through 210j. Additionally, the annular chamber 196 is provided with a plurality of openings 211a through 211j in its top wall 192, with aligned openings 212a through 212j through the bottom wall. The purpose of these openings 211 and 212 is to receive and position valves for a transfer mechanism described in detail in applicant's above-mentioned copending application.

The table 190 is supported on a gear 215 attached to its lower surface. This gear is provided with an opening center, so that it may fit over the lower section 140 of the lower column member 137. A plurality of screws 216 extend upwardly through the gear 215 and engage in the openings in the bosses 205 formed in the webs 197 of the rotating table. Also, screws 217 extend downwardly from the top through the bosses 204 of the rotating table and engage in the gear 215. The gear, as appears in Figs. 2 and 3, has an annular ridge on its upper surface that interfits with a smaller ridge on the lower surface of the rotating table, so that the parts hold together securely and in proper relationship.

The gear 215 is supported upon a roller bearing, generally indicated at 220, the same including conventional bearing races and rollers of annular shape that fit around the outside of the vertical wall 140 of the lower column member 137 and support the table and associated parts on the extending flange of the column member 137, which, in turn, rests upon the base. The bearing 220 provides for proper centering of the parts as well as for reducing the friction while the table, and the parts it supports, rotate.

The gear 215 is adapted to be engaged by a driving gear 225 (Figs. 2 and 6) that is supported upon a vertical shaft 226, upon which is mounted another gear 227 driven by a worm wheel 228 on a driving shaft 229. The shaft 226, the gear 225, and the parts through the worm 228 are enclosed in and supported in a housing 230 that is held by screws to the base member 125. The shaft 229 extends out through a coupling and a bearing 231 to another bearing 232 on an extension 233 bolted to the base 125. A suitable drive for the shaft 229 may be provided. The one here illustrated is a chain drive 234, the chain being driven from some suitable power source not shown.

It will be seen that, when the chain operates, the shaft 229 is rotated, and this ultimately, through the gears 225 and 215, causes the movable table 190 to rotate about the column.

Blank molds

The machine has ten blank or parison molds. Each blank mold unit is mounted on a block 236. The series of these blocks are designated 236a through 236j. Each has an outer portion providing a vertical opening or hole 238. This outer portion has a bottom flange 239 by means of which screws 240 may attach the same to the rotating table 190 as indicated in Figs. 22 and 30. The top of the outer portion receives adjustable hinge collars, as will appear. The block projects backwardly, with an overhang 242. The overhanging part has accurately finished side and bottom surfaces to be received in a positioning block or yoke, as will appear.

Each hole 238 receives a mold hinge pin 245 with a press fit. The pin 245 has an enlarged intermediate threaded portion 246 which is brought down against the block 236. In this position, its bottom end is engageable in the hole 209 to aid in alignment of the molds on the table. A threaded collar 247 engages over the threads 246, and, in turn, receives a clamp 248. This clamp 248 is a split ring that may be drawn tightly about the collar 247. It has an ear adapted to engage in a notch in the block 236, to clamp the attached parts against rotation. The collar 247 is adjustable, while the clamp is loose, to regulate the height of the mold. After proper adjustment is made, the clamp ring 248 is tightened.

A yoke 250 has a bottom pin 251 engageable in a hole 203, and an upper cradle 252 to accurately receive and locate the accurately finished side and bottom surfaces of the block 236. The yokes combine with the hinge pins to give complete, accurate fitting of the parts together in a simple way. After they are thus fitted, the screws 240 are tightened.

Each parison mold, of which there are ten in this machine, is generally designated at 253, and includes a pair of mold halves 254 and 255. The mold section 254 has arms that provide spaced hinge collars 256, connected as shown in Fig. 3. The other mold section 255 is provided with spaced hinge ears 257, connected as shown in Fig. 2. The several ears are interspaced over the hinge pin 245.

The two mold halves 253 and 254 thus may swing about the pin 245 to open or to close. The operation of the molds to open or closing position is obtained by a yoke member 258. This yoke 258 has opposed arms that engage the respective mold halves through suitable links 259.

The shank of the yoke member 258 constitutes a piston rod having, at its inner end, a piston 260. This piston is contained within a cylinder 261 that is supported on the top of the mold block 236 and is positioned thereon by a key 262 that interengages with a groove in the block 236 and a related groove in the bottom of the cylinder. This provides radially accurate positioning of the cylinders on the blocks. Lateral positioning is obtained by depending flanges (not shown) on the sides of the cylinder castings that depend over the sides of the blocks 236. The cylinders are finally secured in position by screws.

The piston rod has an extension 264 thereon that is journaled in a bushing 265 contained within a head 266 that closes the end of the cylinder 261. A cap 267 is provided over the end of the head 266 to hold the journal 265 in place and yet to permit its replacement.

The piston 260 is operated by air that is supplied to its opposite ends under the control of a slide valve, generally indicated 270, that operates within a valve housing 271. There is one valve housing 271 secured to the top of each of the cylinders 260, and, therefore, there is one such valve housing for each set of parison molds.

Each valve housing 271 is located in endwise accuracy on the cylinder by a plug engaged in grooves in the top of the cylinder 261 and the bottom of the valve housing 271. Each valve housing is flanged at its sides, to depend over the side edges of the top of the cylinder, and thereby to secure proper lateral location of the valve on the cylinder. The valve housing is finally secured to the cylinder by screws.

The valve housing 271 has a cylindrical bore therethrough, in which a valve plug 275 slides. This bore is closed at one end by a head 276 that is held in place by screws. This head receives an air inlet line 277 that is threaded thereinto and secured by a lock nut. The air is thereby delivered to the cylindrical housing 271 at one end of the plug 275.

The opposite end of the valve plug 275 projects from the end of the housing 271 and carries, at its outer end, a cam roller 291, in the manner shown. It also has a guide roller 292 held thereon by a screw, this roller reciprocating within a slot in an arm projecting from the top side of the housing 271. This roller prevents rotation of the valve parts, and limits the linear movement of the plug.

In Fig. 3, the valve is shown as actuated to a left hand position toward the central column, under the influence of the air acting against the right hand end of the plug 275. This air has moved the plug 275 as far to the left as it can go, the roller 292 having reached the extreme of its slot. In such position, the air is directed through the plug 275 and passages in the cylinder 261 cooperative therewith until it has acted against the left hand end of the piston 260. In the meanwhile, the foregoing position of the valve plug has effected also a condition for exhaust of the air contained on the opposite side of the piston 260.

Subsequently, the cam roller 291 will come in contact with its cam track and the valve plug will be forced in the opposite direction to the right against the pressure of the air entering the inlet line 277. When this happens, the air entering the air line will be directed to the right hand end of the piston 260, forcing the same to the left, and the air on the opposite face of the piston will be exhausted. A more detailed description of the construction and operation of these air-operated parts is contained in applicant's parent application, above-mentioned.

Blank mold operating valve cam

In the machine shown, there are ten mold sets, and hence ten valves 270. The various valves 270 are sequentially operated by being rotated to bring their cam rollers 291 against a cam arrangement that is mounted on the central column 136. This cam arrangement is shown in Figs. 2, 3 and 35, the last named showing the greatest detail. It includes a cam sector, generally indicated at 300, that is provided with two semicircular hub sleeve parts 301 and 302 clamped around the portion 165 of the column 136 by screws 303. It will be seen that the cam parts may be conveniently removed by withdrawing the screws 303.

The outer edge of the cam sector 300, defined by a vertical arcuate wall 304, receives an arcuate cam plate 305 held to its outer edge by screws 306 extending upwardly from the bottom of the ledge. This cam plate is shown in Fig. 35 as having a sloping left end, and it will be seen that it terminates at its other end immediately beyond the most counterclockwise of its four attaching screws 306.

The cam sector also has an adjustable cam plate 307 that lies over the cam plate 305. This plate 307 provides the point of starting of the cam operation, and, therefore, it extends counterclockwise of the end of the plate 305. However, it terminates in a clockwise direction short of the end of the plate 305, so that the latter will take care of the ending of the cam operation.

The plate 307 has a pair of slots 309 that receive screws 310 that extend into and are secured to the sector 300. These screws permit adjustment of the plate 307 arcuately along the sector.

The foregoing adjustment is made by a mechanism including a link 311 that is pivoted to the clockwise end of the plate 307. The link is also pivoted to a rocker arm 312 pivotally mounted at 313 on the sector. This rocker arm, in turn, carries one end of a link 314 that is pivoted to a crank arm 315. This crank arm is pivotally mounted to the half ring 302 and is non-rotatably engaged by a crank shaft 316. This shaft extends upwardly adjacent the column to the top of the machine, where, as shown in Fig. 1, it is connected through a conventional worm and wheel to an adjusting shaft 321 appropriately supported at the top of the machine. The shaft 321 projects outwardly and has a knurled wheel 323 at its outer end. This knurled wheel is conveniently located at the top of the machine for adjustment purposes.

It will be seen from the foregoing that the rotation of the knurled wheel 323 will provide for the arcuate displacement of the plate 307 so as to regulate the starting points of the cam operations of the blank mold opening and closing valves.

*Blank mold heads*

The blank molds are closed by vacuum finishing mechanisms, shown in Figs. 2, 3, 22 and 30, together with other figures wherein details appear. There is one such mechanism for each of the blank molds. These closing parts are attached to the outer edge of the rotating table 190. As already noted, the rotating table is provided with a plurality of vertical flat portions 206. These furnish bases upon which to mount the supports for the mold closing means.

As shown in Figs. 11, 12, 15, 22, and 30, each vacuum finishing mechanism has a supporting bracket 330 attached to one of the flat portions 206. Reference to Figs. 22 and 30 will disclose that the revolving table is provided with a locating pin 331 extending outwardly from each of the flat portions 206. Each pin has a head that is adapted to interfit into an opening 332 in the inner face of the associated bracket 330. The pin cooperates with an interfitting of certain associated parts, to provide for the accurate locating of the bracket relative to the other parts. When the brackets are properly located, they may be secured into their proper positions by screws 333 that extend inwardly to the table. Other securing means will appear in the description to follow.

Each supporting bracket 330 is provided with a circular threaded opening on a vertical axis. This opening 334 extends downwardly from the top of the bracket and opens into an annular vacuum chamber 335, in the middle of which there is an upstanding frusto-conical tubular sleeve 336 that is adapted to receive a plunger incorporating a slide valve, as will appear. A passage 337 leads from the chamber 335 downwardly and inwardly to the depending side of the bracket 330.

Below the chamber 335, the supporting bracket 330 has a cylinder 340, that is closed at its bottom end by a cylinder head 341 that is held thereto by screws 342. An air piston 343 is adapted to reciprocate within the cylinder 340, and is urged in a downward direction in the drawings by a coil spring 344 acting in a suitable recess in the bracket 330.

The piston 343 is connected to a combined valve and piston rod 345 that reciprocates in the sleeve 336. A bleeder port 346 opens from the space above the piston, to relieve any trapped air in that space.

The operation of the piston 343 is controlled by a valve mechanism that is mounted on the side of the supporting bracket 330, as shown in Figs. 11, 12 and 15. There is a valve housing 348 held to the side of the supporting bracket 330 by screws 349, after it is properly located by a pin 350 that fits in keyways in the interfaces of the parts. This valve housing has an air pressure inlet 351 that opens into a cylindrical bore 352 that extends from adjacent the top of the housing to the bottom thereof. An exhaust passage 353 leads from the side of the housing.

A slide valve 354 reciprocates within the bore 352. This valve projects from the bottom of the bore 352 and has a cam roller 355 secured to its bottom end, as shown in Fig. 13. The valve is held non-rotatably in the valve casing 348 by a cross pin 356 that is secured by a set screw 357, accessible upon removal of the roller 355. The pin 356 reciprocates in slots 358 in the housing 348, so that the valve cannot rotate and is limited as to the extremes of its vertical movement.

The upper part of the valve plug 354 has an axial opening 360 extending partially down from the top thereof. From the bottom of the opening 360, an opening 361 leads radially outward to the surface of the plug.

Above the opening 361, there is a peripheral exhaust groove 362 extending around the plug, and, as shown in Fig. 15, capable of registration with the exhaust line 353. The valve housing 348 has a port 363 in it that is shown in Fig. 15 as registering with the exhaust groove 362. However, when the valve piston 354 is elevated, the exhaust groove is withdrawn from the exhaust port 353 and the inlet passage 361 is caused to register with the port 363 and admit air under pressure thereto. The opening 363 leads to the bottom of the cylinder 340.

The inlet air line 351 has a needle valve 368 interposed in it, so that the inlet flow to the cylinder 340 may be regulated during operation of the machine. This will regulate the speed of the upstroke of the piston 343 and attached parts. The valve 354 may have a spring above it to urge it downwardly, though usually the air flow will be adequate under all conditions of adjustment of the valve 368 to insure proper down travel of the plug.

It will be evident that, when the valve plug 354 is down to the position shown in the drawings, the piston 343 may descend, ejecting the air below it outwardly to the exhaust line. But, when the plug 453 is raised, compressed air passes through the passages 360, 361 and 363 to the cylinder 340 where it is effective to elevate the piston 343 against the spring 344, this elevation taking place at a speed determined by the setting of the needle valve 368, which controls the rate of delivery of compressed air to the cylinder 340. Air pressure acts on the top of the valve 354 and constantly urges it downwardly. It is raised by a cam action to be described.

The pluger 345, that is operated by the piston 343, extends upwardly through the conical sleeve 336 of the support casting 330 and provides a valve portion 380. This valve will be described in detail hereafter. At its upper end, the plunger 345 has (for molds shorter than a maximum size) a tubular extension 381 that fits down over a reduced top of the pluger and is held thereon by a pin 382. It is encased in a cylindrical spacing sleeve 383 (likewise used when molds are used), having a depending skirt 384 that is fitted over a long area into an externally threaded collar 385, thereby assuring an air tight but movable fit. This collar 385 is fitted into a threaded opening in the support bracket 330, and may be adjusted vertically therein by rotating it so that the threads move it up or down, as the case may be, relative to the support bracket. To hold the parts in adjusted position, the collar 385 has a milled flange 386 that is engageable by the end of a dog 387 pivoted between two ears 388 on the outer side of the support 330. A coil spring 389, duly confined by a pin and indentations, as appears in Fig. 22, is provided to maintain the end of the dog 387 in engagement with the adjacent notch on the milled rim of the collar 385.

The spacer sleeve 383 has a partial partition across it, which is provided with an annular set of holes 392 that are spaced around a cylindrical bore 393, in which the upper tubular extension 381 of the piston rod 345 operates and obtains a bearing.

The spacer sleeve 383, at its upper end, receives a cap 395 that has a depending skirt 394 with a close sliding fit into the top of the sleeve. The upper inner diameter of the sleeve is the same as the inner diameter of the collar 385, so that the sleeve may be omitted. This cap 395 has a plurality of ports 396 arranged in a circle therein. It has a center bore 397 to receive a plunger, and a flanged head 398 projecting from its upper surface. This upper surface is adapted for close fit with the mold sections. The projecting head is designed to interfit closely with complementary openings in the mold halves and neck rings.

The head 398 has a flange 399 that has a sloping cross-section. Its sides descend, as shown. Above the flange, the head has a projection that enters the neck rings to cooperate in the formation of the finish. By this arrangement, when the mold halves close over the head 398, their overhanging parts will engage under the sloping surfaces of the flange 399, and will draw the head up slightly insuring a tight fit of the parts, and, at the same time, securing accurate positioning of the two mold parts, as they both are located around the head 398 and its flange. The skirt of the cap member engages the spacer 383 with such a fit and over such an area as to permit the foregoing without breaking the seal between the cap and spacer.

The cap 395 has a plurality of passages 400 that establish air flow paths around it. These passages are shown (Fig. 25) as eight in number. They are formed as grooves leading from the tops of the passages 396, following the contours of the surface of the cap and its head 398, until they terminate in shallow ends (such as .002" deep) opening adjacent the bottoms of the neck rings at the finish.

The center bore receives a plunger member 401 that is secured to the top of the spacer extension 381 of the piston rod 345. The plunger 401 fits over a projection on the top of the extension 381 that is identical with the projection on the plunger 345, and is held thereto by a second pin 382, as shown. The plunger has a shaping plug 402 on its upper end, and around this plug 402 are a circle of openings 403 formed in a shoulder 404.

It will be understood that the upward movement of the plunger member is limited by abutting engagement of the shoulder 404 with a shoulder 405 on the inside of the cap 395. With the plunger 401 thus seated, the plug 402 fits into the opening in the neck rings with a slight clearance (such as .002") to permit a vacuum to be drawn on the glass charge. The upper part of the plug 402 forms the inside of the finish of the bottle from which the blowback is started. This plunger is adapted to reciprocate between the positions it occupies in Fig. 22 and Fig. 30.

There are two neck rings 408 and 409, one being attached to each of the mold halves 254 and 255. As shown in Figs. 22 and 24, each mold half is provided with a suitable recess into which its corresponding neck ring section may be fitted and may be held by suitable headed screws 410. Preferably, the neck ring halves are slightly loose, so that they may adjust themselves when the mold halves are closed.

Each mold section is provided on its bottom with an arcuate groove 415 (Fig. 26), from which a plurality of holes 416 extend upwardly a distance at least sufficient to bring these holes to the top of the neck rings. These holes are arranged in an arc, the diameter of which is approximately equal to that of the neck ring sections, so that, as shown in Fig. 24, the holes 416 constitute a plurality of vertical grooves at the outer surfaces of the neck ring sections when the latter are in place. It will also be seen that the arcuate grooves register with the tops of the openings 396 in the head 395. The top surface of each neck ring section has a sloping recess 420 therein, as appears in Figs. 28 and 29. This may be considered as a tapered upper surface with teeth-like protuberances 421 around the rim thereof. These teeth-like protuberances are designed to insure an air passage from the vertical passages 416 across the top of the neck ring sections. Reference to Figs. 28 and 29 will show that the conical surface at the center bore of the neck rings terminates at 422, a slight distance below the upper surface of the neck rings themselves. This provides a communication space between the neck ring sections and the adjacent walls of the recesses of the mold sections into which the neck rings are fitted, so that, as shown in Fig. 22, there may be a vacuum drawn onto the parison at the top of the neck rings.

In view of the fact that the vertical passages 416 open into the neck ring recesses and are spaced differently from the spacing of the notches between the teeth 421 on the tops of the neck rings, communication across the sloping upper surfaces 420 of the neck rings is also assured.

The finish portions of the mold are adapted to receive both the application of vacuum and the application of pressure. The air flow to the finish portion of the mold takes place through the interior passages of the composite plunger.

Thus it is evident that the passages 403 in the top of the plunger adjacent the finish pin 402 communicate with the interior of the extension 381 of the plunger, which has an opening 425 therethrough. This opening 425, in turn, registers with a bore 426 that extends downwardly from the top of the piston rod 345, as shown in the drawings. At its bottom, as shown in Fig. 15, the bore 426 has a radial passage 428 that terminates in a peripheral groove 429 extending around the piston rod.

The bracket 330, as shown in Fig. 15, has a boss 430 extending between the conical upstanding sleeve 336 and the outer wall. This boss has a passage 431 therein that is adapted to register with the peripheral groove 429 in the piston rod 345. It is also adapted to be connected to an air line 432.

The line 432, Figs. 11, 12, 15 and 16, extends around to a valve housing 435 that is formed as part of the plate 341 that closes the bottom of the cylinder 340. This valve housing has an axial bore 437 extending therethrough from top to bottom, the top part 438 being enlarged to provide a valve seat 439. A valve member 440 is adapted to rest upon this seat, and is urged thereupon by a coil spring 441 that is confined at its upper end by a threaded plug 442. The valve 440 preferably is of the shape shown in Fig. 16, so as to hold the coil spring in place. Below the valve head, there is a stem 444 that passes down through a narrow part of the bore 437 and projects out the bottom thereof, as shown particularly in Figs. 12 and 16. The stem is preferably grooved to permit exhaust from the line 432 when the valve is closed. This groove terminates just below the housing 435 when the valve is closed, and is itself cut off when the valve is raised to open position.

It will be seen that above the valve 440 there is a connection 445 that is adapted to be connected to an air line, as will appear.

The stem 444, which is normally urged downwardly by the coil spring 441, is adapted to be engaged by one end 447 of a rocker arm 448 that is pivotally secured at 449 to a depending panel 450 that projects from the bottom of the cylinder head 341. The extension 447 may engage a pin 451 that is located on the projecting panel 450 to limit the downward rocking movement of the rocker arm 448. This arm carries a cam roller 452 that is secured thereto, as by the screw 453.

It will be seen that, when the cam roller 452 is elevated, the rocker arm 448 is rocked, with the result that the valve 440 is opened and air may pass from the air line 445, past the valve 440, through the connecting line 432, and thence through the port 431, and, with the plunger down, thence through the peripheral groove 429 and the piston rod 345, and finally up through the bore 426 that extends axially upwardly in the composite piston rod. As shown in Fig. 30, this air then discharges upwardly through the ports 403 and into the glass to produce the counterblow.

The vacuum connections for the finish portion of the mold are made from the chamber 335 in the support bracket 330, and thence through the passages 392 above the chamber 335, the interior of the spacer sleeve 383, through the passages 396 and the holes 416, to the space above the neck rings, and also through the grooves 400, to the bottom of the finish, as previously described.

Also, when the piston is in its upper position, the bore in the piston rod is opened to the chamber 335. As shown particularly in Fig. 22, there are a plurality of radial passages 460 that extend outwardly from the bore 426 extending downwardly into the piston rod 345. When the piston rod is down, as shown in Fig. 30, these radial passages are sealed against the portion 336 of the casting 330. However, when the piston rod is elevated and approaches its upper position, as shown in Fig. 22, these radial passages establish communication between the piston rod bore and the vacuum chamber 335.

The bracket 330 is rigidly attached at the back of its depending part, below the table 190, to a hollow valve chamber or housing 465 that is secured by means, such as the screws 464, to the underside of the rotating table 190. It is also held by screws 466 to the depending portion of the casting 330. The bracket 330 has a slight projection around the outlet of the passage 337 that is received in a complementary groove in the valve housing 465. These parts thereby mutually locate each other on the table, and together form, with the other parts previously described, a rigid vacuum connection between the table and the mold.

The housing 465 has an inlet 467 registering with the passage 337. It has an outlet 468 that is in registry with the port 210 leading from the annular vacuum chamber 196 in the rotating table 190. Between these two passages 467 and 468, there is a valve partition 469 that is adapted to receive the end of a valve member. This valve member is an assembly of valve seat and valve head with an operating means that may be inserted from the bottom of the housing 465. To this end, there is an opening 470 in the partition and immediately below it another opening 471 in the bottom wall of the casting 465. A valve assembly support member 472 has an extension 473 that fits upwardly through the two openings 470 and 471 and may be sealed therein. This assembly support 472 is attached to the housing 465 by screws 474.

The upstanding portion 473 of the valve assembly member 472 provides a valve seat 475 just above the partition 469. Below this valve seat, there is a bore providing a valve outlet chamber 476 that registers with an outlet 477 that opens into the passage 468.

A valve 478 controls the flow around the valve seat 475. This valve member 478 is urged by a spring 479 downwardly into seating position. However, it is mounted upon a valve stem 480 that extends downwardly through the valve assembly member 472 and has a yoke at the bottom to hold a cam wheel 481. This cam wheel may be elevated by a cam to open the valve. The valve 478 is shown open in Fig. 22 and closed in Fig. 30.

*Blank mold baffles, and cooling air conductors*

Arranged around the rotating table 190 are a plurality of wind or cooling air columns 490 (Figs. 9, 11 and 36) that interfit with the openings 208 in the top of the rotating table. The columns 490 are hollow and are adapted to receive air under pressure from the air supply spaces within the table. These wind columns are held to the table by suitable screws.

There are a plurality of baffles for the tops of the blank or parison molds that are supported upon the table 190. These include cantilever supporting arms 492 (Figs. 4, 11 and 20). Each arm 492 is held by screws to the top of the table 190 adjacent the periphery thereof. As shown in Fig. 4, these arms are likewise held by screws to the column 490, so that these parts afford mutual aid in their support on the table. The radially inward ends of the arms 492 meet outwardly extending discharge passageway walls 493 that extend outwardly from the column. The arms 492 are hollow adjacent their inner ends, so as to provide wind passages 495 (Fig. 36) that communicate with the interior of the columns 490.

These wind passages 495 open to the tops of the arms 492 and are covered by a wind nozzle arrangement. This latter comprises a lower nozzle 496, an intermediate ring 497, and an upper nozzle 498 with a cap 499 over the top of the last. The upper and lower rings are substantially the same, and, by reference to Figs. 36 and 41–44, it will be seen that each of these rings has two nozzles 500 and 501 that direct air outwardly at angles. A damper 502, adjustable in a groove 503 in the bottom of the nozzle 497, may be employed for adjusting the amount of air that flows to the nozzles 496 and 498. These nozzles are directed toward the adjacent blank mold sections. For example, the nozzles adjacent the column 498 will tend to cool the mold sections 254a and 255b.

Each of the arms 492 extends outwardly in an arcuate manner, as shown for example in Fig. 11, and terminates at its outer end in a head 509 having a vertical circular opening 510 receives a somewhat smaller depending sleeve 511 of a cam track member 512, there being a flange 513 that rests upon the top of the arm 492. Below the head 509 of the arm, there is a cylinder 514 that is flanged at 515, and which closely interfits with the sleeve 511 to provide a seal. The head 509 of the arms is of generally square shape, as shown in Fig. 11. Four screws 516 pass upwardly through somewhat enlarged holes in the corners of the head 509 and hold the cylinder 514, the head 509, and the upper casting 512 together. Additionally, set-screws 517 pass through the wall of the head 509 and engage the sleeve 511. The screws 516 may be loosened, after which the screws 517 may be operated in proper combination to give alignment to the baffle plate mounting on the head. Then the screws 516 may be re-tightened to hold the adjustment.

The cylinder 514 is closed by a cylinder head 518, into which an air line 519 leads. The cylinder contains a piston 520, having a piston rod 521 that extends upwardly through a bushing in the sleeve 511. It also extends out the top of the casting 512, and, at its outer end, supports a baffle head supporting arm 523. These arms 523 are shown in greater detail in Figs. 31 and 32. It will be seen that each arm is clamped to its shaft 521 by a clamping block 525, a screw 526 and a bolt 527.

The outer end of the arm 523 has a head 528 thereon with a vertical threaded opening 529 therethrough. This opening receives the threaded baffle head rod 530, kerfed at its top. It receives a clamp nut 531 that is threaded onto the shaft 530 above the head 528. It also receives a clamping bracket 532 that is held by a screw 533 in a boss 534 rising from the top of the arm 523. The clamp 532 is in the form of a split collar and may be tightened around the shaft 530 by a screw 535. In use, the ring clamp 532 is always held yieldably tightly on the screw 530. The ring 531 may be loosened, after which the screw may be turned in very small increments by a tool inserted in the kerf, and will hold such adjustment. The collar 531 may then be tightened firmly. This arrangement makes possible such fine adjustments as the accurate alignment of baffle plates for oval bottles.

The shaft 530 is designed to support a disc or plate 537 in the manner shown in Fig. 30. This plate has two opposite holes 538 therethrough that are designed to receive pins 539 on a baffle plate 540. The holes are slightly larger than the pins. The baffle plates are shaped to interfit with the tops of the mold sections with a self-sealing, wedging action. A spring 541, as shown in Fig. 33, is adapted to interfit with necks on the two pins 539 to hold the baffle plates onto the support means. The arrangement permits a certain amount of movement of the baffle plate 540 so that they may center themselves and seal properly in the top of the mold sections. It is apparent that this arrangement permits great flexibility for the use of the proper baffle plates for particular molds.

The means for displacing the baffle plates from the position in station $a$ of Fig. 1 to the position of station $b$ comprises mechanism for raising and lowering and twisting the vertical shaft 521 that supports each of the arms 523 and the corresponding baffle plate. To this end, the casting 512, as shown in Figs. 20 and 21, has an opening 543 on one side, through which a cam roller and its clamp may be inserted. The cam roller is shown at 544, and it is adapted to fit in a more or less spiral cam slot 545, having a vertical bottom end, in the casting 512. The cam roller 544 is rotatably mounted on a first clamp member 546, to which a second clamp member 547 is held by screws and both are held by a lock screw, as shown in Fig. 21, to the shaft 521.

It may be seen that, when the piston 520 is caused to move downwardly, the baffle head will be lowered, and the cam roller 544, operating in the cam slot 545, will also cause the shaft 521 to twist, moving the baffle head laterally to the top of the mold. The final seating movement is wholly vertical, as the bottom of the cam slot 545 is vertical. When the piston 520 moves upwardly, the shaft 521 will elevate and twist. As is evident, this vertical and rotary movement is imparted to the baffle plates 540, so that they can move in the manner shown in Fig. 9, and which will be described in more detail hereafter.

The operation of the piston 520 is determined by a valve shown in Figs. 11 and 18. This valve includes a valve housing 550 with a horizontal supporting plate 551 extending therefrom and held by screws to the bottom of the rotating table 190. This valve housing 550 has a vertical bore extending through it. This bore is closed at the top by a cap 552 that is bolted to the housing. This cap receives an air inlet line 553. The housing 550 likewise has two radial air ports into which the air lines 555 and 556, respectively, are connected. These air lines 555 and 556 are connected into the bottom and top, respectively, of the cylinder 514. Additionally, the valve housing has exhaust ports 557 and 558 that discharge into atmosphere or any suitable exhaust lines.

The air flow through the valve 550 is controlled by a slide valve 560 that has a central bore 561 extending downwardly from the top thereof. At the bottom of this bore, there is a radial opening 562, and about the middle of the bore is another radial opening 563. Below the radial bore 562, there is a peripheral groove 564, and above the radial passage 563 there is another peripheral groove 565.

The valve sleeve 560 projects downwardly through the bottom of the housing 551 and is provided with a cam roller 566 at its bottom end. It is prevented from rotation by means of a roller 567 (Figs. 18 and 19) that is rotatably supported on the sleeve 560 and is engageable in a slot 568 in the housing 550. This roller and slot serve to limit the vertical movement of the valve.

It will be seen that, when the sleeve 560 is in its lowermost position, as shown in Fig. 18, the line 555 is connected to exhaust through the peripheral groove 565 and the exhaust line 557. At this time, the air supply from the intake into the cap 552 passes through the vertical bore 561 and out the radial passage 562 into the line 556.

It is also evident that, when the cam roller 566 lifts the sleeve, these conditions will be reversed, the line 555 being connected to the air source, the line 556 being connected to the exhaust 558.

Blank mold cam tracks

The feeding station for the present machine is located at the nine-o'clock position in the drawings. Here, the gob is fed into the closed blank mold, the vacuum comes on and the plunger goes up. The blank mold is, of course, securely closed at this point.

The vacuum is under control of the valve 478 (Fig. 22), which, in turn, is controlled by the cam roller 481. The operation of the plunger is controlled by the valve 348, which is regulated by the cam roller 355. A short time thereafter the baffle must close in preparation for the blowback or counterblow. This baffle operation is controlled by the valve 550, which is, in turn, regulated by the cam roller 566. Finally, the counterblow is under control of the valve 440, which, in turn, is operated by the cam roller 452. The cam rollers 355, 481 and 566 are operated by a set of cam tracks shown in plan view in Fig. 5. These tracks are supported on a track base plate 575 that is held by screws onto the base 125 of the machine.

The inner one of the tracks is for operating the vacuum valve 478 and consists of a main rail 576 that is generally arcuate in shape and that extends from somewhat ahead of the nine-o'clock position in the plan drawings to beyond the nine-o'clock position.

There are a pair of supplementary rails 579 and 580 that are disposed adjacent the ends of the main rail 576, whereby the length of this main rail may be changed in either direction. Means are provided for shifting the rails 579 and 580, each independently of the other, longitudinally of the main rail 576. These means are described in detail in applicant's previously mentioned parent application. Referring particularly to the supplemental rail 580, this adjusting means includes a thumb nut 592 accessible from the side of the machine which, when rotated, is effective to shift the supplemental rail 580 longitudinally. In like manner, the other rail 579 may be regulated by a thumb nut 598. Thus, turning the thumb nut 598 adjusts the start of the vacuum pulldown, and turning the thumb nut 592 adjusts the ending thereof.

The plunger-controlling cam roller 355 is operated by the outer track, which consists of a main rail 603 also secured to the main cam track plate 575. Supplemental rails 605 and 606, at the counterclockwise (starting) and clockwise (ending) ends of the main rail 603, are longitudinally adjustably secured to the main rail 603. Adjustment means, similar to the previously mentioned adjusting means, are provided for the supplemental rail 605 and include a thumb nut 610. In like manner, the supplemental rail 606 is adjusted by rotation of a thumb nut 613.

It will be evident that these various movable tracks may be held sufficiently tightly to prevent accidental displacement of the rails, but loosely enough to permit them to be longitudinally adjusted by the various nuts.

A cam track 615, that operates the baffle plate, is composed of a plurality of main rail strips with supplemental end rails, as shown in Fig. 5. The main rails, reading clockwise, are designated 616, 617, 618, they being bolted, welded, or otherwise secured together at their ends. These several strips are mounted on plates 620, 621, 622, 575 that are attached to the base of the machine.

There is a supplementary rail 623 adjustably attached to the starting end of the track 616 by bolts 624 secured through one rail and engaging in slots in the other.

At the terminal end of this track 615, there is another supplemental end rail 626, held by bolts to the rail 618, and having the previous slot arrangement providing for endwise adjustment of the supplemental rail 623. No specific manual adjusting screws are shown for these rails.

The blowback or counterblow valve 440, which is controlled by the roller 452, admits air under pressure to the mold when the roller 452 rises. This roller is designed to cooperate with a track, generally indicated at 635 (Fig. 5). This track is made of a plurality of strips that are secured to the base or to the extension 233 by suitable plates 636, 637, 638 and 639. There is a supplemental rail at each end of the main rail. At the starting end, the supplemental rail is indicated at 640, it being adjustable along the main rail by screws 641 that engage through slots in the rail 640 and are threaded into the main rail. The supplemental rail at the other end is shown at 642, and it is likewise slidable along the main rail on screws 643 passing through slots in the supplemental rail and threaded into the main rail 635.

The air pressure valve is adapted to be opened also, in addition to its counterblowing, in order to lubricate the blank molds. To this end, at approximately the seven o'clock position in Fig. 5, there is a rail 644 supported on a bracket 645 that is attached to the base 125. When the valve 440 is opened at this time, a stream of lubricated air is directed onto the open blank mold sections.

Vacuum

As heretofore noted, there is an annular chamber 196 within the rotating table 190 that is a vacuum chamber. To it are connected the various passages 468 that are valved by the valves 478 to the passages 337 that are connected to the lower parts of the mold to draw the vacuum on the glass within the mold for the finish pulldown.

As shown in Fig. 9, there are two diametrically opposite vacuum connections leading down into the top of the rotating table 190. These include the two pipes 665 and 666, both having identical fittings 667 and 668, respectively, connecting into the top of the vacuum chamber 196.

As shown in Fig. 8, the pipes 665 and 666 connect into the opposite sides of an annular rotating vacuum chamber 669. This chamber 669 has a box-shaped cross section, as shown in Figs. 2 and 3. It is adapted to rotate upon a stationary member 670 secured by setscrews 671 to the wall 144 of the lower column member.

The member 669 is caused to rotate upon the stationary member 670 by having a connection with the table 190. As shown in Fig. 2, there are two socket members 672 held by screws to the top of the table 190 on opposite sides of the center column. These receive vertical posts or pins 673. These pins pass through ears 675 that are formed integral with and extend laterally from the member 669. Above the ears, coil springs 677 surround the posts 673, and are held by caps screwed into the top of the pins, as is evident from the drawings. It will be understood that the pins are securely held into the socket members 672. Consequently, the springs 677 exert a downward force upon the members 669, causing its lower surface to seal tightly against the horizontal surface on the member 670.

The housing 669 has a plurality of arcuate openings 679 in the bottom thereof. The stationary member 670 has a plurality of ports 680 in its horizontal surface. These ports communicate through the ports 153 in the column member, with the vacuum chamber 151. The arcuate openings 679 are of such length that they will register with any two adjacent ports 680 in the horizontal surface of the member 670. As appears in Fig. 8, it is thus impossible to cut off the flow of air from the chamber 669 into the vacuum chamber 151 at any point in the rotation of the housing 669. Yet a good seal, eliminating pressure loss, is obtained.

The compressed air supply and its course through the machine will be described hereafter.

Finish molds and associated parts

It will be understood that the structure thus far described herein is incorporated in a bottle forming machine adapted to produce finished ware of high quality. Inasmuch, however, as the complete structure of the machine comprises a plurality of independent inventions, and in view of the hereinbefore mentioned divisional status of the present application, a detailed description of certain parts of the machine is deemed unnecessary in this specification. These parts are depicted generally in the sectional views of Figs. 2 and 3, and reference is hereby made to applicant's parent application Serial No. 688,470, filed August 5, 1946, for complete drawings and description thereof.

Briefly, there is a transfer mechanism 682 disposed next above each blank mold 253 and supported between adjacent wind columns 490 by means of flanges 688 thereon. Each transfer mechanism 682 includes a double-acting cylinder 692 connected to a reciprocable vacuum head 775, the latter adapted to interfit with the recesses in the top of the blank mold sections with which the heads 540 of the baffle plates also interfit. The vacuum head 775 is thus enabled to engage a parison or blank in the blank mold for transfer to the finish mold.

This transfer mechanism operates on the vacuum principle. This vacuum is derived from the vacuum chamber 196 of the rotating table 190. As shown in Fig. 11, each opening 211 through the top of this vacuum chamber 196 receives a pipe fitting including an elbow, generally indicated at 800. Piping 801 leads from each fitting and is connected with the vacuum head 775.

Flow from the vacuum chamber 196 to the fitting 800 in the piping 801 is controlled by a valve (not shown) inserted upwardly through the opening 212 of the table 190 and adapted to be operated by a composite cam track 818 (Fig. 5). The track 818 includes a fixed rail 819, a supplemental rail 821 adjustable by means of a thumb nut 825, and a supplemental rail 830 adjustably secured by a bolt and slot arrangement similar to that for the rail 635.

The transfer mechanism is shifted through the action of the cylinder 692 which is adapted to receive air under pressure via an inlet 855. As shown in Figs. 2 and 3, air flow to the cylinder 692 is controlled by an adjustable cam assembly mounted on a sleeve or collar 875 supported upon the central column of the machine. The length of the cam action, as well as the end points, may be regulated by means of adjusting knobs 905 and 934 (Fig. 1) to conform to a desired cycle of operation.

Each of the wind columns 490, that are mounted upon the rotating table 190, as shown in Fig. 36, has an upper ledge 940. The ledge 940 may be formed as a part of a circle. It is provided with a top hole 941, extending upwardly therethrough, and with a vertical circular flange 942 around the hole. The several flanges 942 are adapted to interfit with openings 943 around a blow mold hangar base ring 944.

As shown in Figs. 2 and 3, the supporting ring 944 is adapted to receive a plurality of mold hinge pins and cylinder blocks that are identical with the similar blocks 236 for the blank molds. Thus, the finish or blow molds, generally designated as 966, are mounted and adapted for cam regulated air operation in a manner similar to the blank molds 253. The compressed air for operation of each blow mold is conducted to an air cylinder via an inlet pipe 998, while the cam assembly is supported on a collar 1018 mounted upon the main central column of the machine. The end point of the cam action may be adjusted by means of an adjustment knob 1048 located at the top of the bottle forming machine.

The wind columns 490 have previously been described as supporting the finish mold ring table 944 (Fig. 36). Above the flange of this table 944, there is an extension 1060 on each wind column. This extension has an enlargement 1061 at its lower end with a flange 1062 at the bottom. This flange engages in the hole that receives the top flange 942 on the main column 490. The parts are thereby accurately positioned.

The enlargement 1061 is hollow and has top openings 1064 and 1065 therein. The upper surfaces of the extension 1061 are finished flat, as shown in Fig. 36, and have pins 1066 oppositely thereon. These pins receive openings in nozzle elements 1067 and 1068, these nozzle elements projecting in opposite directions and having passages 1069 therein that register with the openings 1064 and 1065 in the top of the extension 1061, and also open laterally and upwardly, as shown in Fig. 38. By this means, it will be seen that a nozzle member 1067 may cool the lower part of one blow mold, while the nozzle 1068 directs cooling air onto the lower part of an adjacent mold. It is shown in Fig. 36 that the cooling air from the column 490 passes upwardly into the base of the extension 1060. The nozzles may be quickly changed when the molds are changed.

Upwardly from the aforementioned extension 1061, the extension column 1060 has an enlargement 1072 that extends laterally to provide side ports 1073 and 1074. It also has finished upper surfaces on the opposite side of which pins 1075 are located. Nozzles 1076 and 1077 are adapted to have holes that fit over pairs of the pins 1075 and extend downwardly to register with the ports 1073 and 1074 by nozzle passages 1078 and 1079, respectively. As shown in Figs. 36 and 39, these passages 1078 and 1079 project cooling air downwardly and laterally onto adjacent blow molds. The nozzles are also easily replaceable. Dampers may be provided to regulate the air delivery of these nozzles. Two such dampers are shown at 1080 and 1081. They slide in recesses milled into the contact faces of the nozzles.

Blow mold blow heads

The top of the extensions 1060 afford a support for a tie ring 1083, this tie ring being held by screws 1084 to the several composite columns formed by the wind columns 490 and their extensions 1060. A flange interfit positions these parts accurately. The tie ring 1083 is guided at its center part upon a flanged bearing member 1085 that rests upon the center column and is keyed thereto by a key 1086. As is evident from the drawings, the tie disc 1083 is provided with spokes that join an inner hub section 1087 and an outer ring 1088. There is a screw 1084 connecting into a column 1060 at the outer end of each of the spokes.

The tie ring 1083 (Figs. 1, 2 and 3) is ten-sided, being straight between each successive screw 1084. To each of these straight portions there is secured a blow head cylinder adjustment bracket, generally indicated at 1095, which adjustably supports an air cylinder 1110 to a depending projection of which is connected an air passage 1122. The cylinder 1110 is adapted to reciprocate a blow head 1130, which upon reaching its lower limit of travel engages the blow mold 966 and is automatically supplied with air from the passage 1122. Operation of the cylinder 1110 is controlled by a valve 1150 (Fig. 3) which receives compressed air via an air line 1161 and which is, in turn, regulated by a cam 1180 supported on the center column. The cam 1180 has adjustable end points, the finishing point being under control of an adjusting knob 1200.

Feeder connection

Adjacent the nine-o'clock position of the machine, there is a feeder tube 1201, adapted to guide a charge of glass into a blank mold. This feeder tube is preferably of the type shown in the copending application, Serial No. 688,471, filed August 5, 1946, by this inventor, being pivoted at its upper end adjacent the shears, and swinging at its lower end in synchronism with the travel of each blank mold as it passes the charging point.

Air distribution

The compressed air for the operation of this machine is introduced into the top of the center column 165 through a line 1205 at the top of the column. The column is hollow so that the air is conveyed to the bottom thereof where its egress is prevented by a plug 1206. However, adjacent the bottom, there is a radial port 1207 that leads into a distributor (Figs. 2, 3, and 7).

This distributor includes a circular collar-like housing 1208 that is channel-shaped in cross section. It has a hole 1209 that is adapted to register with the radial port 1207 leading from the bottom of the opening 1205 in the column. The collar may be fixed by setscrews, such as the setscrew 1210, so as to be non-rotatable relative to the column.

This collar 1208 is adapted to receive a distributing ring 1212. This ring is adapted to be made in two sections that are held together by suitable screws 1213, appearing in dotted lines in Fig. 7, it being understood that corresponding screws are disposed diametrically opposite those as illustrated. The two halves are fitted into the channel of the collar housing 1208. The two halves are provided with complementary semi-circular passages that provide an annular passage 1214, into which the port 1209 opens. It will be seen that the annular passage or chamber 1214 is thus always provided with compressed air from the column.

Each section of the distributor ring is provided with a groove, into which a semi-circular packing ring 1216 may be inserted. These rings are fitted over pins 1217, by means of which they are positioned and held against displacement. They are also acted upon by a plurality of coil springs 1218 that urge them outwardly against the surfaces of the collar 1208. The ring sections are also adapted to have a close fit at their side edges with the edges of the channels into which they fit. The distributor ring may have suitable oil grooves, as shown.

Each of the two distributor ring sections is provided with a laterally projecting ear 1220 that has a hole to receive a driving pin 1221. The two driving pins are held by screws to the top of the vacuum distributing member 669, as shown for example in Fig. 2. By this means, the rotation of the member 669 will cause the rotation of the distributing ring 1212.

The distributing ring is adapted to have five discharge openings 1223 projecting therefrom.

The machine is provided with five air pressure manifolds 1225. Each manifold takes care of two adjacent forming groups. As shown in Fig. 9, these manifolds are disposed vertically between pairs of adjacent forming groups. A distribution pipe 1226 connects each of the manifolds 1225 with one of the holes 1223 in the distributor.

The manifolds are shown schematically in Fig. 45, along with other parts of the air distribution mechanism. The manifolds 1225 may take the form of vertically disposed pipes, from which the several connections may lead to the operating elements of the mechanism. Fig. 45 shows only a single set of connections to each manifold, leading to a single set of molds. With the exception to be noticed, all of the outlet lines are duplicated to care for two molding groups.

The operating valve of the blank mold cylinder has already been described as having an air inlet line 277. The line is connected into the manifold 1225, as shown in Fig. 45. The plunger cylinder for the blank mold is shown as being operated under control of the valve 348 which receives its air from a line 351, connected into the manifold 1225.

The operating valve for the baffle arm cylinder receives compressed air through a line 553, connected into the manifold 1225.

The operating valve for the transfer mechanism receives compressed air from the inlet line 855, connected into the manifold 1225.

The operating valve for the blow mold cylinder receives compressed air through the intake line 998, which is connected into the manifold 1225.

The operating valve of the blow head cylinder receives compressed air through the intake line 1161, which is connected into the manifold 1225.

It is desirable that the counterblow in the two molds be produced by a low pressure air, so that it will be softer and more gentle in its operation. To this end, there is a supplemental manifold ring 1230 that is mounted on the blow head supporting disc 1083. This ring is provided with two concentric annular manifolds 1231 and 1232. As shown in Fig. 1, the disc 1083 also supports a pair of pressure reducing valves 1235 and 1236. The reducing valve 1235 connects into the inner annular manifold 1232, whereas the pressure reducing valve 1236 connects into the outer manifold 1231. Two of the vertical manifolds 1225 have lines 1237 and 1238, respectively, that lead into the two pressure reducing valves 1235 and 1236. The annular manifold 1232 is connected into the line 445 that leads to the blank mold counterblow mechanism; the manifold 1231 is connected to the line 1122 that leads to the blow mold head for the counterblow therein.

Operation of the machine

The process which this machine is designed to practice comprises the introduction of a charge of glass into a blank mold, the formation of a particular blank therein, the transfer of the blank to a finish mold, and the completion of the ware in the finish mold. All of these operations take place during the continuous rotation of the machine.

For the particular type of ware illustrated, which happens to be light-weight, short, eight-ounce bottles, the rotation of the machine is set at six revolutions per minute. The machine is designed to employ one and one-half revolutions for the complete processing of any bottle. Therefore, it will be seen that it requires fifteen seconds for the fabrication of any bottle from the introduction of the charge to the withdrawal of the completed ware. This mold rate is seen to be adequately slow to enable ware to be properly made. It is, of course, varied by changing the speed of the machine. In general, the machine is slowed down for larger ware and speeded up for smaller ware. The two circles in Fig. 46 have been graduated to indicate time in seconds, it being understood that these times are typical for the particular size and shape of ware being produced. It will be evident that the division of the time of a cycle is different in this process over prior processes.

The datum point for the start of the machine is at the nine o'clock point on the lower circle of Fig. 46. This is the point at which a charge or gob of glass is introduced into each blank mold.

At the start of any operation of this machine, power will be introduced, by any suitable control device, through the chain drive 234, which causes rotation of the shaft 229. This is followed by rotation of the gears 228 and 227, and the vertical countershaft 226, so that the small gear 225 rotates the large gear 215 that is secured to the bottom of the rotating table 190. The table 190 rotates continuously about the base on the roller bearings 220.

It may be seen from the full description of the parts that the rotating mechanism includes the table 190, the wind columns 490 with their extensions 1060, joined by the table ring 944, and the upper disc 1083, which last named disc is journaled to the column. Upon these parts, as a movable framework, the blank mold assemblies are mounted (upon the table 190), the transfer mechanisms are mounted (between adjacent cooling air columns 490), the blow mold assemblies are mounted (on the table ring 944), and the blow heads are mounted (on the disc 1083). The cam tracks remain stationary on the base and the column.

Also, at the start, suitable air pressure will be introduced through the line 1205 into the top of the column 165. This compressed air is transmitted to the bottom of the column and out through the air distributing mechanism. It passes through the port 1207 in the lower part of the column, and thence through the port 1209 and into the distribution chamber 1214 (Fig. 7), whence it passes out into the several pipes 1226 to the manifold air columns 1225 (Fig. 45). The distributing ring 1212 is caused by the pins 1221 to rotate with the table, and its arrangement provides a seal between the rotating and fixed parts. The manifold columns 1225 rotate with the table 190. From these columns 1225, compressed air is distributed in constant supply to the control valves of the several mechanisms, as shown.

In addition, at the start, two of the manifolds 1225 deliver air through the lines 1237 and 1238 that lead through the pressure reducing valves 1235 and 1236 to the annular manifolds 1231 and 1232, formed in the ring 1230 (Figs. 1 and 45). These manifolds thereby receive air at reduced pressures. Each may be individually controlled by its pressure regulator. For example, in certain operations, the pressure in the outer manifold 1231 may be 24 p. s. i., and that in the inner manifold 1232 35 p. s. i. The manifold 1232 delivers air through the line 445 to the valve cylinder 435 for the counterblow of the blank mold. The other manifold 1231 delivers air through the line 1122 to the blow head piston rod, the lower part of which acts as a valve.

In addition to the compressed air situation just set forth, vacuum is also made available at the start. The line 134 leading through the base is connected to a source of suction. This line leads into the vacuum chamber 151 and constantly draws a vacuum in the chamber 669, through the slots 679 and the ports 680 (Figs. 2 and 8). The chamber 669 is constantly connected by the two pipes 665 and 666 through the fittings 667 and 668 with the annular vacuum chamber 196 of the rotating table 190, which thereby constantly has vacuum, for use in the pulldown in the blank molds, and in the transfer mechanism. The chamber 190 provides a vacuum reservoir in proximity to the vacuum operated parts; and makes possible a solid vacuum connection to the heads, as well as to the valve controlling vacuum for the transfer heads.

In addition to the compressed air and vacuum, as aforesaid, there is a cooling air supply that is constantly on. This cooling air supply is delivered through the lower cylindrical opening 132 in the base from the cooling air duct 129. It then is discharged upwardly into the compartment 150 (Fig. 2) at the bottom of the column. This chamber 150 is in constant communication through its ports 152 and the ports 207 into the bottom of the rotating table 190, so that the various sectorial chambers 200 in the rotating table are charged with cooling air. This air is delivered upwardly through the ports 208 of the sectorial compartments 200 of the table 190 to the several columns 490, their extensions and nozzles, to cool the molds, as will appear.

The foregoing gives the status of the elements at the nine-o'clock position which is chosen as the start. This position is shown in Fig. 46. There is a swinging feeder tube 1201 (Fig. 2) that receives a charge of glass that may be in the form of a gob, preferably from a synchronized feeder (not shown). The feeder tube is caused to be rocked with the forming machine, so that the charge of glass may be introduced into the blank mold at the time the table 190 is in a state of continuous rotation. This charge of glass falls by gravity to the bottom of the blank mold 253a, which is closed at this point. Likewise, at this point, the plunger 401 is approaching its upper position that is shown in Fig. 22. This position of the plunger is brought about by the fact that the plunger cam roller 355 has engaged the track 603, to raise the valve plug 354. The air line 351 to this valve constantly receives air from the manifold 1225 at a flow rate determined by the needle valve 368. The air flows from the plug 354 through the passages 360, 361 and 363 to the lower side of the piston 343. The piston rises against the spring 344 at a controlled speed, and thereby relatively slowly introduces its upper parts into the complementary parts of the bottom of the mold. The reduced speed prevents damage in this engagement. It also controls the engagement between the gob of glass and the plug 402.

At the charging point, the vacuum chamber 335 of the particular mold is connected to the annular vacuum chamber 196 of the table 190 because the valve 478 is open, its cam roller 481 having ridden onto its cam track 576. The vacuum in the chamber 335 is transmitted upwardly through the ports 392 and the spacer sleeve to the ports 396 in the head 395. From these ports, the vacuum is pulled at the top and the bottom of the finish. It is pulled at the upper part of the neck rings by the connections comprising the vertical passages 416, which open across the sloping surfaces 420 and the clearance 422 at the top of the neck rings. It is also pulled through the grooves 400 to the bottom of the finish as the gob is positioned in Fig. 22.

At the same time, the plunger plug 402, in approaching its upper position, disposes the ports 469 above the conical sleeve 336. Consequently, at the time the charge is received in the mold, there is a vacuum drawn through the interior of the plunger and through the passages 395 to the bottom of the finish. There is sufficient clearance around the plunger to permit this vacuum to be drawn between it and the adjacent parts of the head 395 that receive the plunger.

The plunger rapidly seats in the head to form the finish completely with the insert therein caused by the plug 402. The coordination of the introduction of the gob into the mold and the travel of the plunger upwardly is such as to prevent either over pressing or under pressing. The speed of travel of the plunger may be regulated during the operation of the machine by adjusting the needle valve 368, coupled with the proper initial adjustment of the plunger cam track 603, so that its initial end piece 605 is engaged at the proper time by the cam roller 355, which adjustment likewise may be made while the machine is operating.

The drawing of vacuum at the top of the neck rings prevents a pull away of the glass at this point.

The foregoing charging and finish forming operation, as indicated in Fig. 46, continues for something under 30° of rotation of the table, which requires somewhat more than one second in the illustrated machine. This is sufficiently long to permit the glass to be pulled down and to complete the finish of the ware to the point shown in Fig. 22. Thereupon, the cam roller 481 of the vacuum valve 478 falls from the cam track 576 and the valve closes. This cuts off the vacuum from the bottom of the mold. At about the same time, the plunger valve cam roller 355 is dropped by the plunger cam track 603, whereupon compressed air constantly available in the line 351, acting upon the top of the plug 354 of this valve, causes it to descend rapidly. Its descent removes the port 361 from communication with the port 363 (Fig. 15), so that compressed air is cut off from below the piston 343. Likewise, the area below the piston is then put into communication with exhaust through the peripheral groove 362 and the exhaust passage 353 leading from the valve housing 348. The piston 343 is then caused to descend by the spring 344.

The descent of the piston 343 withdraws the plunger and the plug 402 to the position shown in Fig. 30. This operation withdraws the vacuum ports 460, leading from the internal passage 426 of the piston rod, out of registry with the vacuum chamber 335 in the bracket 330. The descent likewise introduces the air inlet port 428 of this same axial passage 426 to the air inlet passage 431 connected with the air line 432 (Figs. 15 and 30). This air line 432 leads from below the poppet valve 435 (Fig. 16). The valve head 440 is at this point closed, so that the counterblow air is not yet introduced to the bottom of the mold.

As the table continues to rotate, and at about the same time that the vacuum is relieved and the plunger descends, the baffle cylinder valve cam roller 566 (Fig. 18) drops from the track 615. This admits compressed air through the valve 560 to the line 556 leading to the upper side of the piston 520 (Fig. 20), and causes this piston to descend. At the same time, the line 555 from beneath the piston is connected by the valve 550 through the peripheral groove 565 with the exhaust port 557.

When the piston 520 descends, it is forced to twist, owing to the engagement of the cam roller 544 in the slot 545 in the track member 512. This causes the arm 523 (Fig. 31) carrying the baffle head 540 to descend and twist over onto the top of the blank mold, and finally to move vertically to interfit into the recess provided therein. (Compare stations a and b in Fig. 9.)

After the baffle head has been duly seated by the foregoing action, the counterblow valve roller 452 will ride up onto the counterblow track 635 (Fig. 5), this operation beginning after about one and one-half seconds in the illustration. As shown in Figs. 12 and 16, this will cause the counterblow valve 440 to open, whereupon the relatively low pressure air from the line 445 is admitted to the line 432. As shown in Figs. 11 and 15, the line 432 communicates with the passage 428 leading to the interior axial passage 426 in the plunger. This counterblow air then passes upwardly through the passage 425 in the spacing extension 381 and out through the angular ports 403 (Fig. 30) in the cap of the plunger. It is then discharged into the recess formed by the plug 402 in the bottom of the charge of glass, and causes the glass to expand upwardly, filling blank or parison mold, and forming a portion of the bottom against the baffle plate 540.

The counterblow air is continued from a point between the ten- and 11- o'clock positions of Fig. 46 around to about the two-thirty-o'clock position, about four and three-quarter seconds after the charge. It is very desirable that this counterblow be given sufficient time and operated with sufficiently low pressure to obtain desirable forming of the parison without pulling the finish away. Excessively rapid counterblow gives unequal distribution of the glass in the parison. Also, the continued application of pressure causes the blank to fill out all parts of the blank mold and to rest firmly against the seat provided in the bottom of the baffle plate 540, and a long parison dwell gives a stiff parison, which is desirable.

Thus, at approximately the two-thirty-o'clock position, the cam track 635 (Fig. 5) terminates, and the counterblow cam roller 452 is released, so that the valve 440 (Figs. 12 and 16) can close under the influence of its spring 441. This closing action is augmented by the air pressure differential which provides a higher pressure on the top of the valve. It will be observed that, as this valve 440 is a poppet valve, it is moved by a relatively small amount of motion, which is provided for by the rocker arm 448. When the valve closes, any air behind it may escape out the groove in its stem, which opens only when the valve is down.

With the counterblow completed, the table in its continued rotation again brings the baffle cylinder cam roller 566 to the baffle cam track 615 (see Figs. 5 and 46). This again elevates the valve 560 and introduces the pressure through the axial passage 561 and the port 563 to the line 555 leading to the cylinder 514 below the piston 520, and simultaneously introduces the line 556 above the piston 520 to exhaust by way of the peripheral groove 564 and the exhaust port 558. Thereupon, the compressed air elevates the piston 520 and swings the baffle head off of the blank mold.

Shortly thereafter, as shown in Fig. 46, the transfer head 775 starts down, this being effected by the cam regulated admission of air into the cylinder 692 from the constantly available supply in the line 855.

Each transfer or vacuum head 775 is adapted to seat both in a blank mold and a finish mold in an automatic centering fit which compensates for minor variations in the proper shaping and disposition of the parts. Downward movement of the head 775 then causes it to seat firmly in the top of the blank mold, which is, of course, closed.

After the transfer head has started down, to replace the baffle head on the blank mold, vacuum is drawn through the vacuum head via the line 801, this being instigated by the cam track 818 (Fig. 5). This vacuum is available as the vacuum head seats on the blank mold. The vacuum head is accurately shaped to interfit with the finished bottom of the blank that was formed by the baffle plate, so that the blank is promptly held securely to the vacuum head.

Shortly after the transfer head is seated onto the blank mold, the latter begins to open. This operation is effected by engagement of the cam roller 291 of the blow mold control valve 270, with the track 307 (Fig. 35), to shift the valve plug 275 outward. When the plug 275 is outward, compressor air is valved to the outer end of the piston 260, the inner end being connected to exhaust. The piston 260 moves inward, drawing the yoke 258 inward, and opening the mold sections by the links 259. When the mold is open, the blank is supported wholly by the vacuum head.

At the six-o'clock position, seven and one-half seconds after the start, transfer begins, wherein the cylinder 692 is reversely operated by cam regulated air from the line 855 to effect an upward movement of the vacuum head 775, thus to introduce the blank into the blow or finish mold.

The transfer point is indicated in Fig. 46 by the line connecting the bottom of the lower circle with the lower part of the upper circle. From this point, the blank mold part of the machine prepares itself to receive another charge of glass, while the blow mold proceeds to treat the parison that is transferred.

The blank mold, at the point of transfer, is open. It continues in the open condition for about 40° until the cam roller 452 of the counterblow valve 440 strikes the short track 644 (Fig. 5), and the counterblow valve is again opened. It will be remembered that the plunger is still down, having been released to the lower position when the plunger valve roller 355 was released by the track 603. Consequently, the counterblow air with lubricant contained in it is admitted through the registry of the port 428 of the piston rod 345, and can be directed outwardly by the sloping ports 403 and the upper part of the head 398 to the interior of the then open blank mold sections 254 and 255, to lubricate the mold interior. While this blowing takes place, the blank mold valve roller 291, controlling the valve 270, begins to be released by the segment 305 of its cam track, so that the compressed air acting on the outward end of the valve head 275 forces the same inwardly and shifts it so that compressed air is put to the inner end of the piston 260, forcing it outwardly, the other end of the cylinder being now admitted to exhaust.

The blank mold sections, as shown in Fig. 9, are forced closed by the action of the yoke through the link 259. Shortly before, or at about the time of the closure, the counterblow cam roller 452 drops from the short track 644, and the counterblow air is cut off from the blank mold. It then continues to rotate in closed position, until it returns to the starting position to receive another gob and to start a subsequent forming operation.

As the blank mold sections close, they engage and interfit with the head 399 on the cap 395. The upper and under surfaces of the flange on this head slope, so that engagement can be made despite slight misalignment of the parts. As the closing continues, the recesses in the blank mold parts engage the sloping under surfaces of the flange and lift the entire cap 395 slightly, until the two sections are tightly closed. The deep skirt on the cap 395 has a long sliding fit with the spacer 383 to permit this movement without leaking. The flange not only assures a tight fit of the parts, but also provides accurate relative positioning of the two mold sections, which become located by it.

The neck rings are preferably slightly loose between the screws 410, so that their interfaces will be brought together evenly and tightly.

In the reopening of the mold, previously referred to, the mold sections withdraw from the flange, whereupon the cap 395 again descends onto the spacer 383. This provides clearance between the bottom of the mold sections and the mold head, so that a smooth break of the mold results. This reduces likelihood of pulling the parison with one mold section, and breaking the vacuum between the transfer head and the parison.

It will be noted that, with separate spacers 383, the caps 395 may be closely uniform in weight, so that the lifting load on the mold sections does not greatly vary for different ware.

At the time the transfer is completed and the initially formed parison is disposed in the upper circle of the blow molds, the particular mold into which the transfer is made is open. This mold that constitutes the starting mold for the blow mold operation is at about the seven-o'clock position. Very shortly after the transfer is completed, the blow mold begins to close under the cam regulated influence of the air pressure in the pipe 998, and the vacuum is withdrawn from the transfer head in accordance with the end point position of the cam track 818.

It will be seen that the transfer takes place by a vacuum grip of the finish part of the bottom of the ware, so that the ware is held to the vacuum head as it is brought to upright position to be received by the blow mold.

When the transfer is in its upright position, the parison extends vertically upwardly with its finish at the top of the blow molds. The blow molds engage at the neck of the finish, in the manner shown in Fig. 2, so that the blank projects from the top of the blow molds, and is supported at its top and at its bottom. True alignment of the parison in the blow molds is thus assured.

The parison remains in the blow mold, in the present illustration, for well over a quarter of a revolution and nearly five seconds, during which it can reheat to soften the skin formed in the long blank mold operation. It is not required to stretch down, so that substantially all of the formation of the parison for final blowdown is completed in the blank mold.

Following the extended reheat period, and at the twelve o'clock position in Fig. 46, twelve and one-half seconds after the charging, the blowhead starts down over the top of the blow mold. This is produced by the cam regulated action of the blow head valve 1150. The blow head 1130 is thus introduced over the top of the projecting finish of the ware. This blow head has a recess to receive the projecting finish, and the lower end of the head makes a tight fit with the top of the blow mold.

With the blow head down, air at reduced pressure is delivered thereto via the blowdown air line 1122, and the blowdown for the finish of the ware then takes place. It produces the final ware out of the parison.

At approximately the two-o'clock position, fourteen and one-half seconds after the charging, the blow head valve 1150 is reversed by cam action to effect removal of the blow head from the blow mold. The blow mold then has its top open, and sufficient space is provided for the introduction of the take-out arm.

Shortly after the blow head is withdrawn, the blow mold begins to open, by cam regulated reversal of its air cylinder, so that the same is open ahead of the three o'clock position.

At the three-o'clock position, fifteen seconds after the charging, the take-out arm is introduced between the blow head and the ware, to engage the finish and withdraw the bottle.

At approximately the four-o'clock position, the transfer head is caused to return to the blank mold level. This operation has previously been described.

The complete cycle of any particular charge of glass in the illustration given is seen to take a total of one and one-half revolutions of the table. The take-out point is 180° away from the feeding point. The charge of glass remains in the blank mold approximately 270°, and then is transferred to remain in the blow mold only slightly less than 270°, and in the neighborhood of 240°.

For illustration, this machine, operating to produce sixty bottles per minute, will have a fifteen-second mold rate, which is to say that the time that any charge of glass remains in the molds from the charging point to the take-out point will have a fifteen-second mold rate, which is to say that the time that any charge of glass remains in the molds from the charging point to the take-out point will be fifteen seconds. Assuming an angular distance that a charge is in the blank mold to be 210°, it will be found that the total time for the foregoing operation will be about 5.8 seconds.

In the foregoing example, it has been assumed that the total blank or parison dwell was 210° in angular distance. This 210° represents an approximate usual period of parison dwell for the machine. With it, the parison dwell is 175% of a comparable parison dwell on a conventional machine. It is this long parison dwell that enables a stiff parison to be made.

The foregoing also illustrates the advantages of the overlapping cycle with a continuous machine. It is apparent that the transfer operation does not limit the speed of the machine as a whole. Also, a protracted mold rate is obtained, and consequently better heat dissipation in the various stages of the cycle can be obtained, as well as greater over-all heat dissipation. The present machine accomplishes this despite the fact that it is producing many more bottles per minute than do conventional machines. The fact that the transfer time interval does not hold up the rotation of the machine makes it possible to speed up the machine or to slow it down, and thereby adjust its production to accommodate for different kinds of ware and to produce the maximum production for any particular kind of ware.

Another advantage of this machine is that square shouldered bottles may be made. With the machines heretofore known that transferred by neck rings, it is necessary to have a sufficiently extending neck to accommodate the rings. Hence it is the conventional practice on square shouldered bottles to form a somewhat elongated neck, which gives depressions in the shoulders adjacent the neck, which depressions must be removed in the blow molds. This is an obvious disadvantage and results frequently in production of shoulders that are rounded rather than square. It also results in weak spots or heavy spots at these points.

In the present machine, the absence of neck rings for the transfer makes it possible to produce finishes with very short necks that merge almost directly into the shoulders of the bottles. The shoulders may be as square as desired. The transfer is made by holding the bottom of the bottle so that it puts no limitations upon the styling of the finish.

Installation adjustments

It is necessary to have certain parts of the machine capable of change. For example, molds must be changeable to make ware of different shapes and sizes.

The mold sets, both blank and blow molds, may be withdrawn as units. The screws 240 that hold the blocks 236 to the table 190 are removed, and the air connections released, whereupon any blank mold may be withdrawn as a unit including its power cylinder and valve. Any blow mold unit may likewise be withdrawn. As the blocks 236 are all identical, this makes possible the quick removal of any mold and the substitution of another one. The several blank mold units are all interchangeable, as are the blow mold units. In replacing one blank mold unit with another, for example, complete and accurate alignment is obtained by the engagement of the mold pin in a hole 209 and the saddling of a block in a yoke 252. Thereafter, the screws are tightened merely as holding means. No drive pins or the like are required. These positioning elements are sufficiently removed from the highly heated parts to be unaffected by expansion.

A blank mold may be removed from its pin 245 by disconnection of the links 259, and the lifting of the mold sections from the pin 245. Thereafter, a different mold may be installed over the pin 245 and properly connected to the yoke. Conventionally, all molds have hinge ears of the same size and shape. The changing of a blow mold follows a like procedure.

If the mold newly installed is substantially different in length, it may be necessary to withdraw the spacer 383 (Fig. 22), and, if a spacer is required on the new mold, to insert a spacer of different length. If the shape of the finish part of the ware is substantially different, different neck rings will be used and possibly a different plug assembly 395 may be required. Where the spacer 383 is changed, the extension 381 of the plunger will be replaced by one of a size corresponding to the new spacer ring 383. This latter change is easily accomplished when the head 395 is withdrawn from the top of the spacer, and the spacer itself is removed.

In the installation of molds into this machine, one of the controlling factors is the proper seating of the transfer head into the blank and the blow molds. A transfer head 775 will be installed, which head most nearly approximates the spacing requirements between its swinging support and the blank and blow molds. Thereupon, the machine will be operated until the transfer head is in position to be seated in the top of the blank molds. Thereupon, the ring 248 surrounding the collar 247 is loosened. The collar 247 is then turned to raise or lower the mold to secure precise seating of the transfer head in the top of the blank mold, after which the ring 248 is again tightened. This adjustment is accommodated for by lost motion vertically in the hinges of the mold to the yoke 258.

When the foregoing adjustment is complete, the head for the blank mold is properly adjusted. As previously noted, the spacer sleeve 383 and the extension 381 on the plunger are chosen so as most nearly to approximate the proper spacing of these parts to given proper engagement of the head with the blank mold. It is required for most advantageous operation of this machine that the cap 395 on the head be raised slightly as the mold halves close over it. Such raising permits the mold sections to be properly aligned one with the other, and also secures the best fit of the parts for sealing purposes. Likewise, the dropping away of the cap 395 when the mold sections open relieves the mold sections of any frictional engagement with the head almost as soon as the mold sections begin to crank open, with the result that smoother opening operation results and less likelihood of sticking of the parison to one or the other of the mold halves is present.

In order to secure this adjustment for the proper amount of lifting, the latching dog 387 is rocked against its spring 389 to free it from the peripheral teeth on the collar 385. Thereupon, the collar is turned until the spacer 383 and the cap 395 are at the proper elevation to achieve the foregoing desired results. As already described, the seating of the plunger itself is under the influence of air below the piston 343. Hence, this piston is adequately self-adjusting for the foregoing purpose.

The baffle head likewise must be suitably adjusted to seat firmly on the top of the mold. This may be accomplished by the loosening of the screws 526 and 527 (Fig. 31) and the sliding of the entire arm 523 on the column 521, followed by the re-tightening of the screws when the head is in its proper position. A fine adjustment of this may be made by loosening the nut 531 and turning the shaft 530. This latter adjustment is also convenient for proper positioning of the head 540 relative to the mold, in respect to its proper angular position about its axis of rotation. In fact, this is the prime purpose for this fine adjustment, because the baffle head is lowered by air pressure and will therefore seat with some tolerance in the adjustment of the arm 523. In order, for example, to get the proper angular disposition of the head 540 for oval bottles, the nut 531 is loosened and a tool is inserted in the kerf in the shaft 530 and the same is turned until the head is properly aligned. In this operation, the screws 535 are always turned down so that there is a frictional holding of the shaft 530 against rotation except when force is applied thereto. By this means, the shaft will retain its position to which it is adjusted, and thereafter the nut 531 may be turned down to lock it in that position.

The baffle may be adjusted in a horizontal plane by loosening the screws 516, and then adjusting the screws 517 until the baffle seats accurately in the recess in the mold. Then the screws 516 are re-tightened.

If the shape of the baffle plate requires change, it is only necessary to remove the spring 541 from the necks on the pins 539. Whereupon, the head 450 and the attached pins 539 may be withdrawn from the plate 537. A new head may then be inserted and the spring returned to its place. It has already been described how the clearances in the head provide for its self-centering into the mold when it is closed.

The transfer head is likewise provided for quick change to accommodate alteration in mold size. A transfer unit may be replaced easily by removing the screws that attach the unit between adjacent columns 490, whereupon it may be lifted and withdrawn radially outwardly from the machine. A new unit may be installed by reversing the process.

The vacuum head 775 may easily be removed by a twisting motion, whereupon a different head of proper length or shape or size may be installed.

Other preliminary adjustments relating to the transfer mechanism and the blow molds are clearly explained in applicant's parent application previously mentioned.

If the changes in the mold are great, it may be necessary to substitute new cooling air nozzles on the column 490. If the blank mold is very much longer or shorter than one previously used, the spacer 497 (Fig. 36) may be changed for one of proper size. The nozzle elements 496 and 498 may easily be changed, as they are held by screws into place. The nozzles 1067 and 1068 may easily be replaced, because they are merely fitted over the pins 1066. Similarly, the nozzles 1078 and 1079 may easily be replaced, because they are merely engaged over the pins 1075. Such changes will provide nozzles that properly accommodate the size and shape of molds employed.

Timing adjustments

All adjustments of the timing of the various elements of the mechanism, that may be required during the operation of the machine, may be made during the operation. Certain adjustments, however, are not normally required during the operation, and therefore are made only when the machine is initially set up for operation. For example, the operation of the blank mold baffle head does not normally require adjustment during the cycle, and may be taken as a datum upon which the other parts of the cycle may be based.

The operation of the baffle head is controlled by the composite cam track 615 (Fig. 5). The baffle is caused to come off when the baffle cam roller 566 (Fig. 18) rides up onto the first element of the cam track 615. This consists of the strip 623 (Fig. 5), which may be adjusted along the fixed track 615 by loosening the screws 624, shifting the track 623, and then re-tightening the screws. Sufficient time is provided between the completion of the counterblow in the blank mold and the introduction of the transfer head to the top of the mold to provide ample time for the removal of the baffle head for the introduction of the transfer head. Hence the track element 623 may be adjusted at the beginning of a set-up of the machine, and this normally will be adequate for any operation of the machine. The track 623 must lead the advance section of the vacuum track, and must lead the starting edge of the transfer cam sufficiently that the baffle head will be out of the way of the transfer head.

The other end of the baffle cam track is likewise adjustable, it consisting of a strip 626 that is secured to the strip 618 by screws that engage in slots, as aforesaid. The point at which the baffle track ends is the point at which the baffle comes onto the blank mold. This must necessarily come between the end of the vacuum pull-down on the blank and the start of the counterblow. However, it may constitute the datum point for the adjustment of the plunger and vacuum operations, and the counterblow for practically all molds that will be used on the machine will find sufficient time on the length of the cam 635. In other words, it is sufficient to have a preliminary positioning of the final end 626 of the baffle cam track and not to provide for adjustment thereof during operation.

Prior to the charging of the blank mold, it must be closed. This is accomplished by the cam structure shown in Fig. 35. For the present, it will be assumed that the blank mold is properly closed, prior to the introduction of a charge.

It will be noticed from Fig. 5 that at the time the charge is introduced into the blank mold the vacuum valve 478 will be open, and vacuum will be drawn onto the mold. This will assist in drawing the charge of glass into the bottom of the blank mold, as already described, and will be available at the instant the charge is delivered to the mold, regardless of possible variations in the coordination of the feeder. This vacuum must continue for a sufficient length of time to insure the formation of the finish of the blank. It may be necessary, owing to variations in the consistency of the glass, or for other reasons, to alter the duration of this vacuum flow. Furthermore, it must be coordinated with the upward operation of the plunger, so that it will be available when the plunger opens its port 460 to the vacuum supply, and will be off when the plunger is withdrawn so as not to injure the skin of the finish.

For these purposes, the vacuum track has two adjustments. The first involves the rotation of the hand wheel 598 (Fig. 5) to move the advance strip 579 of the vacuum track to change the starting point of the vacuum stroke, and to insure that vacuum is properly available as soon as the charge is introduced into the closed blank mold. This adjustment assures proper vacuum when the charge is received, regardless of variations in the speed of the machine, or the length of the path that must be evacuated. The other adjustment of the vacuum track is obtained by rotation of the thumb nut 598 (Fig. 5), and the consequent displacement of the final cam track strip 580 to vary the end point of the vacuum stroke. It may be considered that these two variations or adjustments are made relative to the operation of the baffle, because, for purposes of description, it has been assumed that the baffle constituted the datum point for the adjustments. The vacuum must be off when the plunger is withdrawn, lest damage to the finish occur. Hence, it is coordinated with the adjustment of the plunger cam track.

The operation of the plunger for the blank mold is subject to three regulations. This plunger must be moving up at the time the charge is introduced into the mold, so that the glass will not descend through the mold. On the other hand, it is necessary to have the charge of glass descend to the bottom of the neck rings completely, in order to form the finish without overpress or underpress.

To start the plunger and have it in the proper position at the time the charge of glass is introduced into the mold, the leading track element 605 of the plunger track (Fig. 5) is adjustable by means of the hand nut 610. The hand nut 592 determines the point at which the plunger shall start down.

However, the track element 605 merely determines the point at which the valve 354 shall shift. When this valve is up (Fig. 15), the air is introduced (through the needle valve 368) to the lower end of the cylinder below the piston 343. The start of the upstroke of the plunger and the speed with which it travels, being functions of the aforementioned track adjustment and the adjustment of the valve 368, should be regulated so that the plunger is not quite seated at the time the charge is brought into the mold. This will permit the glass to fit well into the neck rings, and will avoid underpress. The plunger must be far enough up to prevent overpress. The speed of the plunger must be regulated by the valve 368 to prevent bouncing of the glass off the plunger and up-driving of the glass out of the finish. Thus the cam track element 605 (Fig. 5) is preset to insure that the plunger can be up at the proper time, and the valve 368 is adjusted during operation to obtain proper speed and position of the plunger at the point of introduction of the glass charge.

As already noted, the plunger descends at a time coordinated with the withdrawal of the vacuum and the return of the baffle by the adjustment of the end of the track element 606 through the hand nut 613. When the plunger valve cam roller leaves this final track element, the plunger will descend rapidly under the influence of the coil spring 344.

When the plunger is withdrawn, the shell of cooled glass that was formed about its plug is immediately reheated by the remainder of the hot glass in the charge. The baffle comes on an instant later under the control of the baffle valve cam roller 566, which leaves the end of the baffle track, which latter is initially adjusted as already described.

Adequate time is provided in these operations to permit the shell or skin, formed around the plunger plug, to reheat by the time the counterblow begins. The beginning of the counterblow is determined by the setting of the end 640 of the blowback track 635, which is initially adjusted as already described. When the cam roller 452 of the counterblow valve engages the track element 640, the counterblow will begin. It continues for approximately 100°, this being in point of time a much greater period than is given to producing parisons in former machines. After the counterblow air has been cut off at a time fixed by the adjustment of the end track element 642, the blank mold continues its travel for some 28°, more or less, when the baffle is removed. This time of parison dwell is ample to compress the glass firmly in the blank mold and retain it there to provide a thick skin that is relatively even over the parison, with less difference between the finish and the remainder of the parison. It makes a parison having rigidity permitting its transfer to the blow mold without substantial deformation.

The baffle arm is caused to withdraw the baffle plate by the engagement of the baffle valve cam roller 566 with the initial end of the baffle cam track 615. This end is adjustable, as are the ends of the counterblow cam track 635.

Thereafter, the transfer head starts down. The point at which it starts down is adjustable by adjusting the position of its advance cam track element. This adjustment is accomplished by the thumb screw 934 (Fig. 1).

During the operation of the transfer head from its upper to its lower position, the vacuum is introduced thereto by the engagement of the transfer vacuum valve with the cam track 818, and more particularly with the end strip 821 of this cam track. This point is adjustable by the thumb nut 825 (Fig. 5), which shifts this initial vacuum cam track rail 821 relative to the fixed rail 819. This vacuum should be on at the time the transfer head is introduced to the blank mold.

The speed of downswing of the transfer head is controlled by the shape of the cam element which initiates the action of the cylinder 692. This element is individually replaceable. If the machine is speeded up, it may be necessary to advance this cam element by the thumb screw 934, as some time is inevitably required to build up the air pressure in all cylinders. It is for this reason, among others, that the various air operated devices are provided with adjustable cams; and those requiring close synchronization are adjustable during operation. The transfer head must be down in time to hold the parison when the blank mold opens.

Likewise, the opening of the transfer vacuum is controlled during operation of the hand screw 825. This makes it possible to assure operating vacuum on the transfer head when it should engage the parison, regardless of such changes as variations in speed of the machine.

The transfer operation consists in a return of the transfer head to its upper position, with the parison held thereto, by vacuum on the vacuum head while the latter is interfitted with the completed bottom of the parison accurately shaped by the baffle head. The start of the transfer operation is adjusted to occur after the blank mold begins to open, and after sufficient time has elapsed for the vacuum head of the transfer mechanism to seize hold of the bottom of the parison. The final transfer cam track element is likewise adjustable, this adjustment being made by the thumb nut 905 which determines the point of release of the transfer operating cam. The speed of this release is a function of the slope of the edge of this final cam element, which is a separate and replaceable part. The speed of the final part of the transfer operation is also regulated by the adjustment of spring tension in the transfer mechanism itself.

The blank mold must begin to open prior to the shift of the transfer mechanism. This requires a shift of the blank mold valve 270, which is produced by engagement of its roller 291 with the initial part 307 of the cam structure shown in Fig. 35. The point at which this operation begins is initially set by the arcuate displacement of the cam track element 307 on the screws 310. This cam track element 307 has slots 309 engaging over the screws 310. It may be adjusted by turning the thumb nut 323, which rotates the shaft 316, and, through the connecting arms, shifts the track element. This coordination may be made during operation. The blank mold will begin to close when the valve cam roller leaves the end element 305 of this track. This will take place at a time sufficiently ahead of the charging point to have the blank mold completely closed when the charge is introduced into the mold.

The blow mold must be open at the time the take-out takes place. The opening point is determined by the preliminary setting of the advance element of the blow mold cam track, which may be made when the machine is initially set up. The end of this opening of the blow mold is determined by the adjustment of the final cam track element, as regulated by the thumb nut 1048. By this arrangement, the point at which the blow mold closes may be adjusted to take place only after the transfer is completed.

After the blow mold is closed, the vacuum must go off the transfer head. This occurs when the transfer vacuum valve is closed by the release of its cam roller from the track 818. The point may be initially adjusted by the adjustment of the end cam track element 830. This is normally an initial adjustment made when the machine is set up for operation, and is designed to occur substantially simultaneously with or slightly before the complete closure of the blow mold.

The parison is usually permitted to rest in the blow mold for a substantial period of time prior to the blowdown. This is to permit the skin on the parison to reheat from the hot glass it contains. The point at which the blow head starts down is determined by the cam structure which operates the control valve 1150, so that the blow head will descend. This point is controlled by adjustment of the thumb nut 1200 at the top of the machine. The blow head descends promptly, and when it reaches its lower position automatically valves the blowdown air into the blow head. The final blow takes place as long as the blow head is down, and, therefore, the conventional adjustment of both the reheating period and the final blow period is made by the previously mentioned adjustment of the thumb nut 1200, which provides a division of the total reheating and final blow periods. From the nature of the construction of the blow head, the blowdown air is cut off at the start of the withdrawal of the blow head. Almost immediately thereafter, the blow mold begins to open by the engagement of its control valve cam roller with the blow mold cam track as aforesaid. The blow mold then completes its opening for the ware take-out.

The foregoing completes a cycle of one bottle, it being understood that the identical cycle is provided for each of the successive molds.

It will also be understood that the conventional pressure reducing valves 1235 and 1236 may be adjusted to provide the proper air pressure to control the speed of the counterblow and the blank mold and the blow down in the finish mold.

From the foregoing it may be seen that this invention provides for faster production of better ware, with less complication than heretofore. It enables the manufacture of ware to be supervised by one man. It accomplishes its objectives previously set forth.

What is claimed is:

1. In a glass machine, a mold, a mold head engageable therewith, fluid flow passages in the mold and head, said mold comprising separable sections, finish forming elements, one movably supported on each mold section, the fluid flow passages extending by separate routes both to the inner and outer ends of the elements, for communication with the mold cavity so that vacuum may be drawn onto the glassware immediately beyond each end of the finish without the necessity for extension through the mold cavity.

2. A mechanism for use in forming glassware including a support, means for supporting a mold on said support, air flow means for cooperating with the mold to form a glass object in said mold pneumatically, said last named means including a bracket fixed to the support, said bracket having a pneumatic passage therein, a plunger operable in said bracket, a sleeve-like extension for communicating said bracket with a supported mold, a head on said sleeve-like extension for engagement with the mold, and means for adjusting said sleeve-like extension toward or from the bracket to regulate the proximity of the head to the mold.

3. In a glass machine, a support, mold head mechanism mounted on the support, mold means mounted on the support for cooperation with the mold head mechanism, the mold head mechanism including a bracket fixed to the support, a cap element engageable with the mold, said cap element having a central bore for accommodating a plunger, air conducting means in said cap element exteriorly of said central bore, air conducting means supporting the cap element on the bracket, and means for adjusting said supporting air conducting means and said cap element on said bracket toward and from the mold.

4. In a glass machine, a support, mold head mechanism mounted on the support, mold means mounted on the support for cooperation with the mold head mechanism, the mold head mechanism including a bracket fixed to the support, a cap element engageable with the mold, said cap element having a central bore for accommodating a plunger, air conducting means in said cap element exteriorly of said central bore, air conducting means supporting the cap element on the bracket, and means for adjusting said supporting air conducting means and said cap element on said bracket toward and from the mold, said last named means including a collar having threaded engagement with the bracket, the collar supporting the means that supports the cap element.

5. In a glass machine, a support, mold head mechanism mounted on the support, mold means mounted on the support for cooperation with the mold head mechanism, the mold head mechanism including a bracket fixed to the support, a cap element engageable with the mold, air conducting means in said cap element, air conducting means supporting the cap element on the bracket, and means for adjusting said supporting air conducting means and said cap element on said bracket toward and from the mold, said last named means including a collar having threaded engagement with the bracket, the collar supporting the means that supports the cap element, the collar having peripheral teeth therearound, and a latching dog normally urged into engagement with said teeth to prevent rotation thereof, said latching dog being removable from such engagement.

6. In a glass machine, a mold, a mold head, a support upon which both the mold and the mold head are mounted in spaced relationship, the mold head including a hollow air conducting sleeve, a mold head element having a plug-like portion slidably interfitted into the sleeve, said element having air conducting means registering with the interior of the sleeve, the plug-like portion being of sufficient length to insure a seal between the sleeve and the element despite limited movement of the plug-like portion out of the sleeve, and said element having means thereon engageable by the mold, and sealable with the mold, the engagement of the plug-like portion within the sleeve automatically permitting the interengagement aforesaid without breaking the seal, the sleeve being movable relative to the support, and interengaging adjustment means between the sleeve and the support movable to adjust the sleeve toward and from the mold.

7. A mold head assembly for a glass machine including a fixed bracket, a mold head cap element, an air conducting spacing sleeve interposed between the bracket and the mold head cap element, said spacing sleeve being removable for the substitution of a sleeve of different length, a rod-like plunger member supported on the bracket, a plug member having air conducting perforations therein, an air conducting extension member removably mounted onto the plunger member, and to which the plug member is removably mounted, said extension member being disposed within the spacing sleeve, and means including passages in said plunger for intercommunicating said air conducting extension member with said air conducting spacing sleeve.

8. A mold head assembly for a glass machine including a fixed bracket, a mold head cap element, a hollow spacing sleeve interposed between the bracket and the mold head cap element, said spacing sleeve being removable for the substitution of a sleeve of different length, means for adjustably positioning the spacing sleeve relative to the bracket and thereby adjusting the vertical elevation of the cap element, a rod-like plunger member supported on the bracket, a plug member adapted for abutting engagement with the cap element, an extension member removably mounted onto the plunger member, and to which the plug member is removably mounted, said extension member being disposed within the spacing sleeve, the bracket having a cylinder therein, and a piston within the cylinder connected to the plunger member for operating the same so as to raise the plug member into abutting engagement with the cap element.

9. A mold head member for a glass machine including a fixed bracket, a mold head cap element, a hollow spacing sleeve interposed between the bracket and the mold head cap element, said spacing sleeve being detachable from both, whereby it may be removable for the substitution of a spacer element of different length, a rod-like plunger member supported on the bracket, a plug member, an extension member removably mounted onto the plunger member, and to which the plug member is removably mounted, said extension member being disposed within the spacing sleeve, the plunger member and the extension member having an axial passageway therethrough, the plug member having outlets therein, and a plurality of ports from said axial passageway, one of said ports being connectible with vacuum when the plunger member is in one position, and being closed when it is in its other position, the other of said ports being connectible with a source of compresed air when the plunger member is in said other position and being closed when it is in said one position.

10. A mold head for a glass machine including a fixed bracket, a mold head cap element, a hollow spacing sleeve interposed between the bracket and the mold head cap element, said spacing sleeve being detachable from both, whereby it may be removable for the substitution of a spacer element of different length, a rod-like plunger member supported on the bracket, a plug member, an extension member removably mounted onto the plunger member, and to which the plug member is removably mounted, said extension member being disposed within the spacing sleeve, the plunger member and the extension member having an axial passageway therethrough, the plug member having outlets therein, a plurality of ports from said axial passageway, one of said ports being connectible with vacuum when the plunger member is in one position, and being closed when it is in its other position, the other of said ports being connectible with a source of compressed air when the plunger member is in said other position and being closed when it is in said one position, and means operable at selected intervals for controlling the flow of air to said air port of said plunger member.

11. A mold head for a glass machine including a fixed bracket, a mold head cap element, a hollow spacing sleeve interposed between the bracket and the mold head cap element, said spacing sleeve being detachable from both, whereby it may be removable for the substitution of a spacer element of different length, a rod-like plunger member supported on the bracket, a plug member, an extension member removably mounted onto the plunger member, and to which the plug member is removably mounted, said extension member being disposed within the spacing sleeve, the plunger member and the extension member having an axial passageway therethrough, the plug member element having outlets therein, a plurality of ports from said axial passageway, one of said ports being connectible with vacuum when the plunger member is in one position, and being closed when it is in its other position, the other of said ports being connectible with a source of compressed air when the plunger member is in said other position and being closed when it is in said one position, and means operable at selected intervals for controlling the application of vacuum to said vacuum ports of said plunger.

12. In a glass machine, a mold head, a fixed bracket for supporting the mold head, vacuum chamber means in the bracket, connecting vacuum chamber means in the mold head, a movable plunger in the mold head, a passageway through the plunger, the plunger having a mold engaging part on its outer end adapted to cooperate in the formation of glass in a mold when said plunger is extended, means to extend and withdraw the plunger, port means connecting the passageway of the plunger with the vacuum chamber in the bracket when the plunger is extended, valve means for controlling the connection of the vacuum chamber with a source of vacuum, and means operable at selected intervals for operating said valve.

13. In a glass blowing machine, the combination of claim 12, wherein the means to extend the plunger comprises pneumatic means, a supply line to said pneumatic means, means to adjust the flow through said supply line to regulate the speed of said pneumatic means, and timing valve means to control the flow in said line.

14. In a glass machine, a mold head bracket, means to support the mold head bracket, the mold head bracket having a cylinder at one end and a piston rod sleeve extending from the cylinder, a piston in the cylinder, a piston rod extending through the piston rod sleeve, an air chamber in the bracket, an opening in the end of the bracket opposite the cylinder, means supporting a spacer sleeve in the opening, the interior of the spacer sleeve communicating with the air chamber in the bracket, the spacer sleeve supporting means having a cylindrical opening, and the spacer sleeve having a cylindrical skirt interfitting slidably with the opening, whereby the spacer sleeve may be readily removed from the bracket, an extension for the piston rod, interfitting surfaces for aligning the extension and the piston rod, the spacer sleeve having a cylindrical bore for guiding the piston rod and its extension, a removable pin passing through the extension and the piston rod to hold the same together, the extension extending up through the spacer sleeve, a mold head element having a projecting skirt portion slidably engaged into the spacer sleeve, the mold head element having an opening into which the piston rod extension may extend and may move slidably, a plug member removably engaged over the end of the extension and interfitted therewith, and a pin through the interfitting parts, said pin being accessible when the spacer sleeve is removed.

15. In a glass machine, a mold head bracket, means to support the mold head bracket, the mold head bracket having a cylinder at one end and a piston rod sleeve extending from the cylinder, a piston in the cylinder, a piston rod extending through the piston rod sleeve, an air chamber in the bracket, an opening in the end of the bracket opposite the cylinder, means supporting a spacer sleeve in the opening, the interior of the spacer sleeve communicating with the air chamber in the bracket, the supporting means for the spacer sleeve having a cylindrical opening, and the spacer sleeve having a cylindrical skirt interfitting slidably with the opening, whereby the spacer sleeve may be readily removed from the bracket, an extension for the piston rod, interfitting surfaces for aligning the extension and the piston rod, the spacer sleeve having a cylindrical bore for guiding the piston rod and its extension, a removable pin passing through the extension and the piston rod to hold the same together, the extension extending up through the spacer sleeve, a mold head element having a projecting skirt portion slidably engaged into the spacer sleeve, the mold head element having an opening into which the piston rod extension may extend and may move slidably, a plug member removably engaged over the end of the extension and interfitted therewith, and a pin through the interfitting parts, said pin being accessible upon removal of the spacer sleeve, and an adjustable valve for controlling the rate of admission of air to the cylinder.

16. In a glass machine, a mold head bracket, means to support the mold head bracket, the mold head bracket having a cylinder at one end and a piston rod sleeve extending from the cylinder, a piston in the cylinder, a piston rod extending through the piston rod sleeve, an air chamber in the bracket, an opening in the end of the bracket opposite the cylinder, means supporting a spacer sleeve in the opening, the interior of the spacer sleeve communicating with the air chamber in the bracket, the supporting means for the spacer sleeve having a cylindrical opening, and the spacer sleeve having a cylindrical skirt interfitting slidably with the opening, whereby the spacer sleeve may be readily removed from the bracket, an extension for the piston rod, interfitting surfaces for aligning the extension and the piston rod, the spacer sleeve having a cylindrical bore for guiding the piston rod and its extension, a removable pin passing through the extension and the piston rod to hold the same together, the extension extending up through the spacer sleeve, a mold head element having a projecting skirt portion slidably engaged into the spacer sleeve, the mold head element having an opening into which the piston rod extension may extend and may move slidably, a plug member removably engaged over the end of the extension and interfitted therewith, and a pin through the interfitting parts, said pin being accessible upon removal of the spacer sleeve, a slide valve supported on the bracket for controlling admission of air to the cylinder, and adjustable means for regulating the rate of admission of air into the cylinder to control the rate of movement of the piston therein.

17. In a glass machine, a mold head bracket, means to support the mold head bracket, the mold head bracket having a cylinder at one end and a piston rod sleeve extending from the cylinder, a piston in the cylinder, a piston rod extending through the piston rod sleeve, an air chamber in the bracket, an opening in the end of the bracket opposite the cylinder, means supporting a spacer sleeve in the opening, the interior of the spacer sleeve communicating with the air chamber in the bracket, the supporting means for the spacer sleeve having a cylindrical opening, and the spacer sleeve having a cylindrical skirt interfitting slidably with the opening, whereby the spacer sleeve may be readily removed from the bracket, an extension for the piston rod, interfitting surfaces for aligning the extension and the piston rod, the spacer sleeve having a cylindrical bore for guiding the piston rod and its extension, a removable pin passing through the extension and the piston rod to hold the same together, the extension extending up through the spacer sleeve, a mold head element having a projecting skirt portion slidably engaged into the spacer sleeve, the mold head element having an opening into which the piston rod extension may extend and may move slidably, a plug member removably engaged over the end of the extension and interfitted therewith, and a pin through the interfitting parts, said pin being accessible when the spacer sleeve is removed, air passage means in said piston rod and extension, and a port through said bracket registerable with said air passage means.

18. A mold in sections, a finish insert for each section, and means attaching each insert to its section for movement therewith, at least one of said attaching means permitting relative movement between the section and the insert, the inserts being adapted to be brought together when the mold sections are closed, and the movable insert being adapted to aid fitting together of the inserts, each insert having grooved passage means across its surface beyond the finish forming parts, and cooperating grooved passage means formed in the mold sections to effect air pressure flow through the first named passage means.

19. In a glass machine, a support, a sectional mold mounted thereon, a head for engagement with the mold, interengaging means between the head and the mold engageable by the mold as it closes, said means being shaped to move the head to secure tight engagement, means holding the head on the support, the holding means permitting movement of the head as aforesaid, a plunger slidably mounted in the support and slidably received in the head, means actuated by fluid pressure for moving the plunger toward the mold, and shoulder means in the head for limiting the extent of movement of the plunger toward the mold when the head is in tight engagement with the mold as aforesaid.

20. In a glass machine, a support, a sectional mold mounted thereon, a head for engagement with the mold, interengaging means between the head and the mold engageable by the mold as it closes, said means being shaped to move the head to secure tight engagement, means holding the head on the support, the holding means permitting movement of the head as aforesaid, a plunger slidably mounted in the support and slidably received in the head, means for moving the plunger toward the mold, shoulder means in the head for limiting the extent of movement of the plunger toward the mold when the head is in tight engagement with the mold as aforesaid, and adjustable means for controlling the rate of movement of the plunger toward the mold for insuring a proper sequence of said tight engagement and said limitation of movement of the plunger.

21. In a glass blowing machine, a sectional mold having movable sections, a movable head, engageable with the mold, a support for the head, a plunger mounted in the support and received in the head, the head being slidably connected with both the support and the plunger for movement relative thereto in the absence of movement therebetween, the mold sections and the head having interlocking male and female parts interengaged when the mold sections are closed to prevent separation of the head and the mold, the movability of the head permitting the said interengagement to occur without detaching the head from the support, the plunger being controllably reciprocable relative to both the head and the support, means for reciprocating the plunger including spring means for moving it in one direction and pnuematic means for moving it in the other direction, said latter means including a supply line and means for adjusting pnuematic flow therethrough and means in the head for limiting the movement of the plunger in the direction of its pneumatic movement.

22. In a glass blowing machine, a sectional mold having movable sections, finish forming elements in the mold, a movable head adapted to interfit with the mold, a support for the head, a plunger mounted in the support and received in the head, the head being slidably connected with both the support and the plunger for movement relative thereto in the absence of movement therebetween, the plunger being controllably reciprocable relative to both the head and the support, a shaping plug at one end of the plunger adapted to cooperate with the finish forming elements and with the movable head in the formation of a glassware finish, interlocating means between the mold and both the finish forming elements and the movable head and hence between the finish forming elements and the movable head, interlocating means between the movable head and the plunger and hence between the head and the shaping plug, said several interlocating means being cooperative to achieve a predetermined relation between the finish forming elements, the movable head, and the shaping plug, means for moving the head into predetermined relation with the finish forming elements, and means for moving the shaping plug into predetermined relation with the moved head, said latter means comprising adjustable means for controlling the speed of movement of the plunger, the interlocating means between the movable head and the mold including interlocking male and female parts interengaged when the mold sections are closed to prevent separation of the head and the mold, the movability of the head permitting said interengagement to occur without detaching the head from the support.

23. In a glass machine, a mold head assembly comprising a fixed bracket, a mold head cap element, a hollow spacing sleeve interposed between the bracket and the mold head cap element, said spacing sleeve being removable for the substitution of a sleeve of different length, a rod-like plunger member supported on the bracket, a plug member, an extension member removably mounted onto the plunger member, and to which the plug member is removably mounted, said extension member being disposed within the spacing sleeve, the bracket having a cylinder therein, a piston within the cylinder connected to the plunger member for operating the same, a fluid conduit connected into the cylinder, and means to adjust the rate of fluid flow through the conduit to regulate the speed of the piston and hence of the plunger member independently of the speed of movement of other parts of the machine.

24. In a glass machine, a mold head bracket defining a chamber, said bracket having a cylinder adjacent one end of the chamber and a piston rod sleeve extending from the cylinder and terminating within the chamber, a piston in the cylinder, a piston rod extending reciprocably through the piston rod sleeve and through the chamber, fluid passage means in the piston rod including an opening located for alternate disposition within the piston rod sleeve and communication with the chamber, and means for reciprocating the piston rod.

25. In a glass machine, a mold head bracket defining a chamber, said bracket having a cylinder adjacent one end of the chamber and a piston rod sleeve extending from the cylinder and terminating within the chamber, a piston in the cylinder, a piston rod extending reciprocably through the piston rod sleeve and through the chamber, fluid passage means in the piston rod including an opening located for alternate disposition within the piston rod sleeve and communication with the chamber, and a port extending through the bracket and terminating within the piston rod sleeve for communication with said opening, the piston comprising means for reciprocating the piston rod so as alternately to communicate the opening with the chamber and with the port.

References Cited in the file of this patent

UNITED STATES PATENTS

| | | |
|---|---|---|
| 1,072,553 | Winder | Sept. 9, 1913 |
| 1,255,317 | Kadow | Feb. 5, 1918 |
| 1,277,607 | La France | Sept. 3, 1918 |
| 1,490,182 | O'Neill | Apr. 15, 1924 |
| 1,499,522 | Hall | July 1, 1924 |
| 1,670,821 | Pauling et al. | May 22, 1928 |
| 1,679,502 | Sears | Aug. 7, 1928 |
| 1,693,069 | Cramer | Nov. 27, 1928 |
| 1,718,651 | La France | June 25, 1929 |
| 1,729,363 | Schwenzfeier | Sept. 24, 1929 |
| 1,739,845 | La France | Dec. 17, 1929 |
| 1,740,310 | Lorenz | Dec. 17, 1929 |
| 1,792,988 | Kadow | Feb. 17, 1931 |
| 1,843,160 | Ingle | Feb. 2, 1932 |
| 1,911,119 | Ingle | May 23, 1933 |
| 1,929,842 | Foster | Oct. 10, 1933 |
| 1,931,375 | Cook et al. | Oct. 17, 1933 |
| 1,956,203 | Rowe | Apr. 24, 1934 |
| 1,957,410 | Miller | May 1, 1934 |
| 1,959,428 | Hoge | May 22, 1934 |
| 1,968,777 | Bridges | July 31, 1934 |
| 1,992,951 | Howard | Mar. 5, 1935 |
| 2,129,614 | Bridges | Sept. 6, 1938 |
| 2,161,255 | Howard | June 6, 1939 |
| 2,205,261 | Winder | June 18, 1940 |
| 2,259,991 | Bennett | Oct. 21, 1941 |
| 2,289,046 | Rowe | July 7, 1942 |
| 2,314,290 | Smith et al. | Mar. 16, 1943 |
| 2,508,890 | Rowe | May 23, 1950 |